United States Patent
Saha et al.

(10) Patent No.: US 11,917,618 B2
(45) Date of Patent: Feb. 27, 2024

(54) SIDELINK FEEDBACK RESOURCES

(71) Applicant: QUALCOMM Incorporated, San Diego, CA (US)

(72) Inventors: Chiranjib Saha, San Diego, CA (US); Le Liu, Fremont, CA (US); Alberto Rico Alvarino, San Diego, CA (US); Vishnu Vardhan Chetlur Ravi, San Diego, CA (US); Kazuki Takeda, Tokyo (JP); Umesh Phuyal, San Diego, CA (US); Xiao Feng Wang, San Diego, CA (US); Peter Gaal, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/452,761

(22) Filed: Oct. 28, 2021

(65) Prior Publication Data

US 2023/0133718 A1    May 4, 2023

(51) Int. Cl.
*H04L 5/00* (2006.01)
*H04W 72/20* (2023.01)
*H04W 72/0446* (2023.01)
*H04W 72/51* (2023.01)

(52) U.S. Cl.
CPC .......... *H04W 72/20* (2023.01); *H04L 5/0051* (2013.01); *H04W 72/0446* (2013.01); *H04W 72/51* (2023.01)

(58) Field of Classification Search
None
See application file for complete search history.

(56) References Cited

U.S. PATENT DOCUMENTS

2017/0295596 A1*  10/2017  Chen ................... H04W 74/008
2021/0391948 A1*  12/2021  Taherzadeh Boroujeni ...............
                                                            H04L 5/0091

FOREIGN PATENT DOCUMENTS

WO    WO-2021056583 A1 *  4/2021

OTHER PUBLICATIONS

Machine translation of WO2021056583 (Year: 2021).*

* cited by examiner

*Primary Examiner* — Robert M Morlan
(74) *Attorney, Agent, or Firm* — QUALCOMM Incorporated

(57) ABSTRACT

Various aspects of the present disclosure generally relate to wireless communication. In some aspects, a mobile station may receive an indication of a first set of resources for feedback and an indication of a second set of resources for feedback, where the second set of resources are associated with a smaller quantity of cyclic shifts than the first set of resources. Accordingly, the mobile station may transmit feedback on either the first set of resources or the second set of resources based at least in part on a distance associated with the feedback. As an alternative, the mobile station may compute a timing advance associated with transmission of feedback. Accordingly, the mobile station may feedback that is shifted in time according to the timing advance. Numerous other aspects are described.

30 Claims, 21 Drawing Sheets

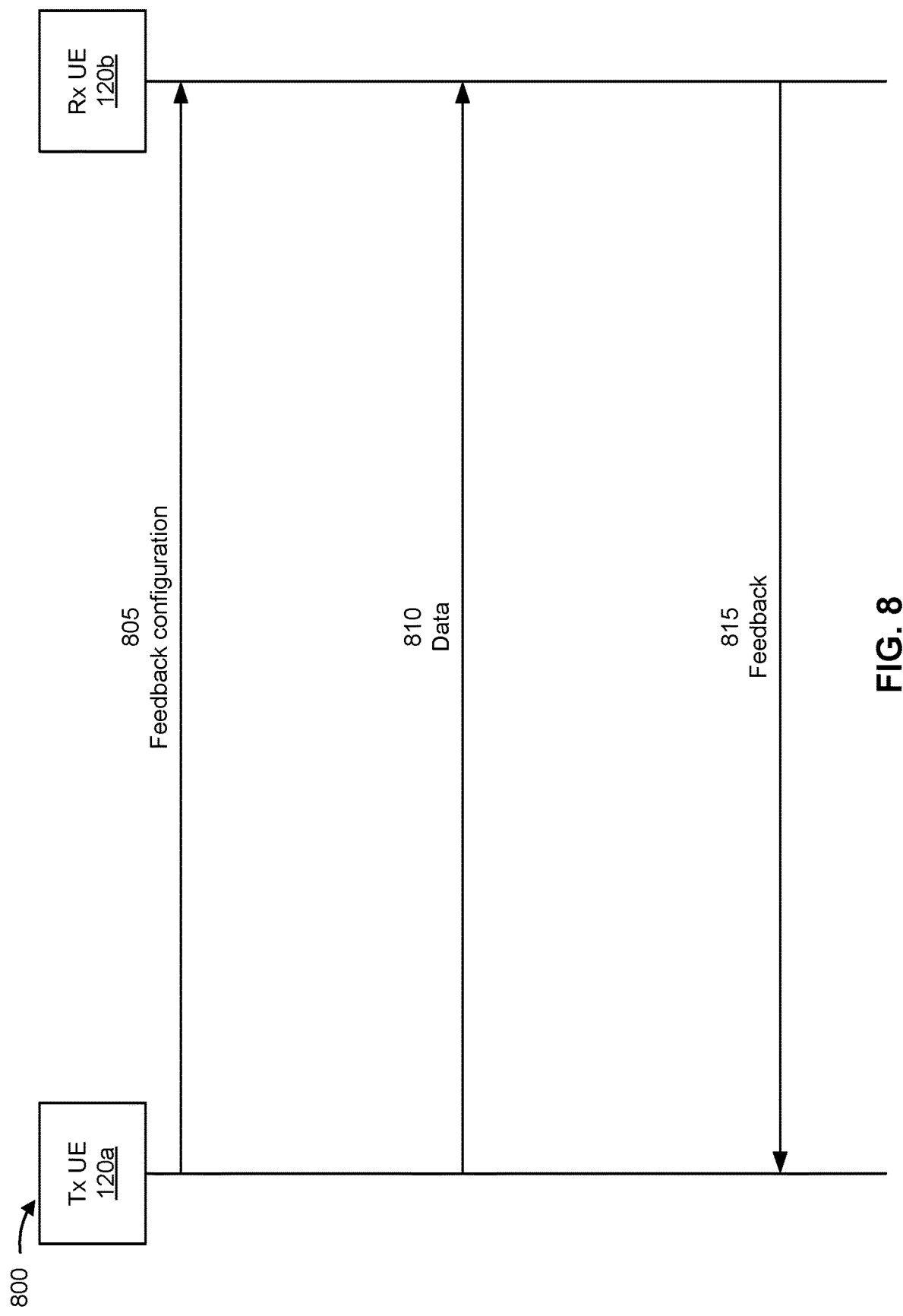

SIDELINK FEEDBACK RESOURCES

FIELD OF THE DISCLOSURE

Aspects of the present disclosure generally relate to wireless communication and to techniques and apparatuses for configuring and using sidelink feedback resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example associated with configuration of long-range sidelink feedback between mobile stations, in accordance with the present disclosure.

SUMMARY

Figure 1:
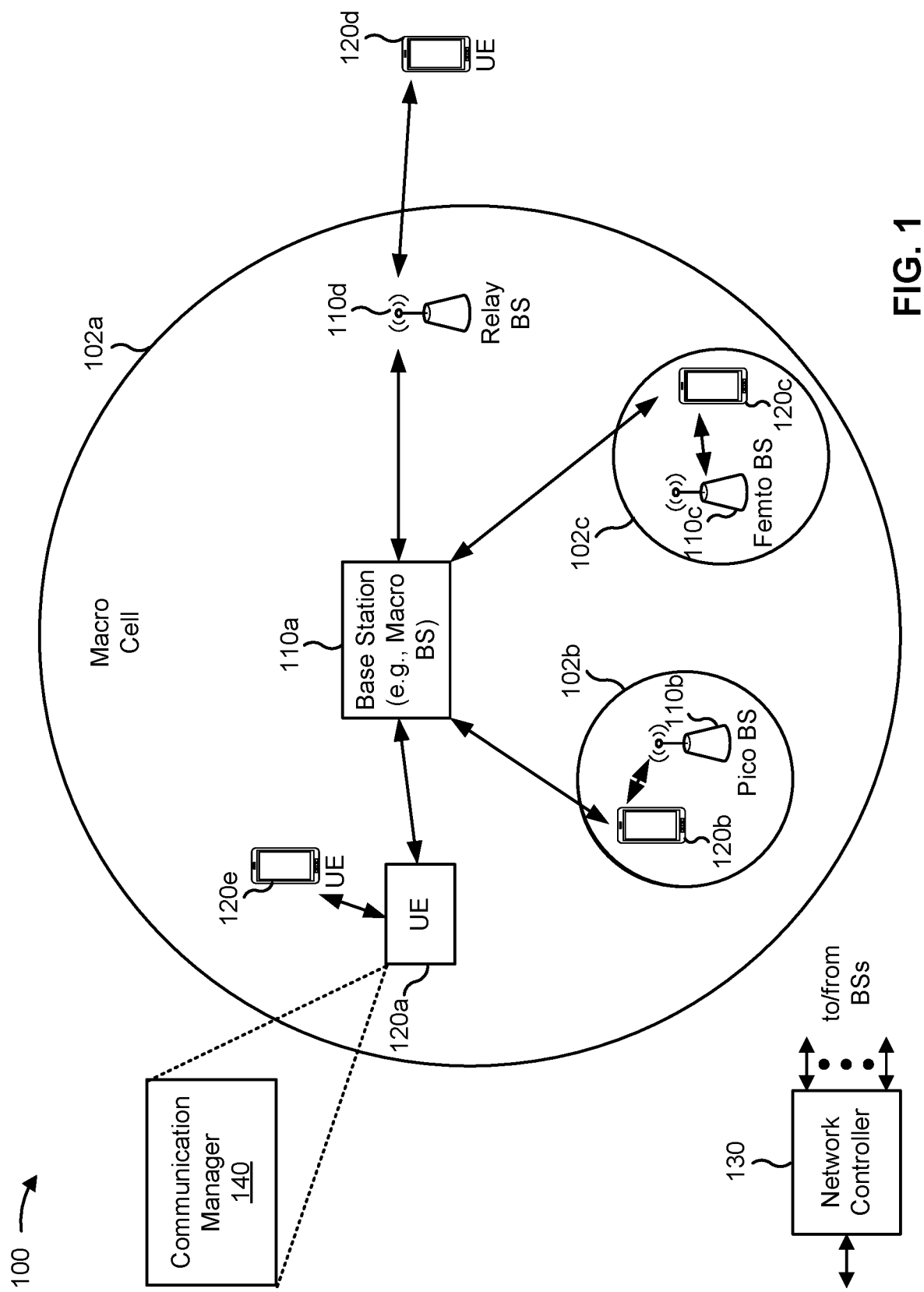
FIG. 1 is a diagram illustrating an example of a wireless network, in accordance with the present disclosure.

Some aspects described herein relate to a method of wireless communication performed by a mobile station. The method may include receiving an indication of a first set of resources for feedback and an indication of a second set of resources for feedback, wherein the second set of resources are associated with a smaller quantity of cyclic shifts than the first set of resources. The method may include transmitting feedback on either the first set of resources or the second set of resources based at least in part on a distance associated with the feedback.

Some aspects described herein relate to a method of wireless communication performed by a mobile station. The method may include determining a first set of resources for feedback and a second set of resources for feedback, wherein the second set of resources are associated with a smaller quantity of cyclic shifts than the first set of resources. The method may include transmitting an indication of the first set of resources and an indication of the second set of resources.

Some aspects described herein relate to a method of wireless communication performed by a mobile station. The method may include computing a timing advance associated with transmission of feedback. The method may include transmitting feedback that is shifted in time according to the timing advance.

Some aspects described herein relate to a method of wireless communication performed by a transmitting mobile station. The method may include transmitting information associated with at least one distance threshold, to a receiving mobile station, for long-range sidelink feedback. The method may include transmitting an indication associated with a plurality of sets of minimum communication ranges (MCRs) to the receiving mobile station.

Some aspects described herein relate to a method of wireless communication performed by a mobile station. The method may include receiving an indication of a first set of resources and an indication of a second set of resources, wherein the second set of resources are associated with a smaller quantity of cyclic shifts in demodulation reference signals (DMRSs) than the first set of resources. The method may include transmitting DMRSs on either the first set of resources or the second set of resources based at least in part on a distance associated with the DMRSs.

Some aspects described herein relate to a method of wireless communication performed by a mobile station. The method may include determining a first set of resources and a second set of resources, wherein the second set of resources are associated with a smaller quantity of cyclic shifts in DMRSs than the first set of resources. The method may include transmitting an indication of the first set of resources and an indication of the second set of resources.

Some aspects described herein relate to a method of wireless communication performed by a mobile station. The method may include receiving a configuration associated with DMRSs on a sidelink channel. The method may include transmitting DMRSs that are staggered across symbols, include cyclic shift hopping across symbols, are denser than one DMRS per four resource elements (REs), or a combination thereof.

Some aspects described herein relate to a method of wireless communication performed by a mobile station. The method may include determining a configuration associated with DMRSs on a sidelink channel, wherein the configuration is associated with DMRSs that are staggered across symbols, include cyclic shift hopping across symbols, are denser than one DMRS per four REs, or a combination thereof. The method may include transmitting the configuration.

Some aspects described herein relate to an apparatus for wireless communication at a mobile station. The apparatus may include a memory and one or more processors coupled to the memory. The one or more processors may be configured to receive an indication of a first set of resources for feedback and an indication of a second set of resources for feedback, wherein the second set of resources are associated with a smaller quantity of cyclic shifts than the first set of resources. The one or more processors may be configured to transmit feedback on either the first set of resources or the second set of resources based at least in part on a distance associated with the feedback.

Some aspects described herein relate to an apparatus for wireless communication at a mobile station. The apparatus may include a memory and one or more processors coupled to the memory. The one or more processors may be configured to determine a first set of resources for feedback and a second set of resources for feedback, wherein the second set of resources are associated with a smaller quantity of cyclic shifts than the first set of resources. The one or more processors may be configured to transmit an indication of the first set of resources and an indication of the second set of resources.

Some aspects described herein relate to an apparatus for wireless communication at a mobile station. The apparatus may include a memory and one or more processors coupled to the memory. The one or more processors may be configured to compute a timing advance associated with transmission of feedback. The one or more processors may be configured to transmit feedback that is shifted in time according to the timing advance.

Some aspects described herein relate to an apparatus for wireless communication at a transmitting mobile station. The apparatus may include a memory and one or more processors coupled to the memory. The one or more processors may be configured to transmit information associated with at least one distance threshold, to a receiving mobile station, for long-range sidelink feedback. The one or more processors may be configured to transmit an indication associated with a plurality of sets of MCRs to the mobile station.

Some aspects described herein relate to an apparatus for wireless communication at a mobile station. The apparatus may include a memory and one or more processors coupled to the memory. The one or more processors may be configured to receive an indication of a first set of resources and an indication of a second set of resources, wherein the second set of resources are associated with a smaller quantity of cyclic shifts in DMRSs than the first set of resources. The one or more processors may be configured to transmit DMRSs on either the first set of resources or the second set of resources based at least in part on a distance associated with the DMRSs.

Some aspects described herein relate to an apparatus for wireless communication at a mobile station. The apparatus may include a memory and one or more processors coupled to the memory. The one or more processors may be configured to determine a first set of resources and a second set of resources, wherein the second set of resources are associated with a smaller quantity of cyclic shifts in DMRSs than the first set of resources. The one or more processors may be configured to transmit an indication of the first set of resources and an indication of the second set of resources.

Some aspects described herein relate to an apparatus for wireless communication at a mobile station. The apparatus may include a memory and one or more processors coupled to the memory. The one or more processors may be configured to receive a configuration associated with DMRSs on a sidelink channel. The one or more processors may be configured to transmit DMRSs that are staggered across symbols, include cyclic shift hopping across symbols, are denser than one DMRS per four REs, or a combination thereof.

Some aspects described herein relate to an apparatus for wireless communication at a mobile station. The apparatus may include a memory and one or more processors coupled to the memory. The one or more processors may be configured to determine a configuration associated with DMRSs on a sidelink channel, wherein the configuration is associated with DMRSs that are staggered across symbols, include cyclic shift hopping across symbols, are denser than one DMRS per four REs, or a combination thereof. The one or more processors may be configured to transmit the configuration.

Some aspects described herein relate to a non-transitory computer-readable medium that stores a set of instructions for wireless communication by a mobile station. The set of instructions, when executed by one or more processors of the mobile station, may cause the mobile station to receive an indication of a first set of resources for feedback and an indication of a second set of resources for feedback, wherein the second set of resources are associated with a smaller quantity of cyclic shifts than the first set of resources. The set of instructions, when executed by one or more processors of the mobile station, may further cause the mobile station to transmit feedback on either the first set of resources or the second set of resources based at least in part on a distance associated with the feedback.

Some aspects described herein relate to a non-transitory computer-readable medium that stores a set of instructions for wireless communication by a mobile station. The set of instructions, when executed by one or more processors of the mobile station, may cause the mobile station to determine a first set of resources for feedback and a second set of resources for feedback, wherein the second set of resources are associated with a smaller quantity of cyclic shifts than the first set of resources. The set of instructions, when executed by one or more processors of the mobile station, may further cause the mobile station to transmit an indication of the first set of resources and an indication of the second set of resources.

Some aspects described herein relate to a non-transitory computer-readable medium that stores a set of instructions for wireless communication by a mobile station. The set of instructions, when executed by one or more processors of the mobile station, may cause the mobile station to compute a timing advance associated with transmission of feedback. The set of instructions, when executed by one or more processors of the mobile station, may further cause the mobile station to transmit feedback that is shifted in time according to the timing advance.

Some aspects described herein relate to a non-transitory computer-readable medium that stores a set of instructions for wireless communication by a transmitting mobile station. The set of instructions, when executed by one or more processors of the mobile station, may cause the mobile station to transmit information associated with at least one distance threshold, to a receiving mobile station, for long-range sidelink feedback. The set of instructions, when executed by one or more processors of the mobile station, may further cause the mobile station to transmit an indication associated with a plurality of sets of MCRs to the mobile station.

Some aspects described herein relate to a non-transitory computer-readable medium that stores a set of instructions for wireless communication by a transmitting mobile station. The set of instructions, when executed by one or more processors of the mobile station, may cause the mobile station to receive an indication of a first set of resources and an indication of a second set of resources, wherein the second set of resources are associated with a smaller quantity of cyclic shifts in DMRSs than the first set of resources. The set of instructions, when executed by one or more processors of the mobile station, may further cause the mobile station to transmit DMRSs on either the first set of resources or the second set of resources based at least in part on a distance associated with the DMRSs.

Some aspects described herein relate to a non-transitory computer-readable medium that stores a set of instructions for wireless communication by a mobile station. The set of instructions, when executed by one or more processors of the mobile station, may cause the mobile station to determine a first set of resources and a second set of resources, wherein the second set of resources are associated with a smaller quantity of cyclic shifts in DMRSs than the first set of resources. The set of instructions, when executed by one or more processors of the mobile station, may further cause the mobile station to transmit an indication of the first set of resources and an indication of the second set of resources.

Some aspects described herein relate to a non-transitory computer-readable medium that stores a set of instructions for wireless communication by a mobile station. The set of instructions, when executed by one or more processors of the mobile station, may cause the mobile station to receive a configuration associated with DMRSs on a sidelink channel. The set of instructions, when executed by one or more processors of the mobile station, may further cause the mobile station to transmit DMRSs that are staggered across symbols, include cyclic shift hopping across symbols, are denser than one DMRS per four REs, or a combination thereof.

Some aspects described herein relate to a non-transitory computer-readable medium that stores a set of instructions for wireless communication by a mobile station. The set of instructions, when executed by one or more processors of the mobile station, may cause the mobile station to determine a configuration associated with DMRSs on a sidelink channel, wherein the configuration is associated with DMRSs that are staggered across symbols, include cyclic shift hopping across symbols, are denser than one DMRS per four REs, or a combination thereof. The set of instructions, when executed by one or more processors of the mobile station, may further cause the mobile station to transmit the configuration.

Some aspects described herein relate to an apparatus for wireless communication. The apparatus may include means for receiving an indication of a first set of resources for feedback and an indication of a second set of resources for feedback, wherein the second set of resources are associated with a smaller quantity of cyclic shifts than the first set of resources. The apparatus may include means for transmitting feedback on either the first set of resources or the second set of resources based at least in part on a distance associated with the feedback.

Some aspects described herein relate to an apparatus for wireless communication. The apparatus may include means for determining a first set of resources for feedback and a second set of resources for feedback, wherein the second set of resources are associated with a smaller quantity of cyclic shifts than the first set of resources. The apparatus may include means for transmitting an indication of the first set of resources and an indication of the second set of resources.

Some aspects described herein relate to an apparatus for wireless communication. The apparatus may include means for computing a timing advance associated with transmission of feedback. The apparatus may include means for transmitting feedback that is shifted in time according to the timing advance.

Some aspects described herein relate to an apparatus for wireless communication. The apparatus may include means for transmitting information associated with at least one distance threshold, to a receiving mobile station, for long-range sidelink feedback. The apparatus may include means for transmitting an indication associated with a plurality of sets of MCRs to the mobile station.

Some aspects described herein relate to an apparatus for wireless communication. The apparatus may include means for receiving an indication of a first set of resources and an indication of a second set of resources, wherein the second set of resources are associated with a smaller quantity of cyclic shifts in DMRSs than the first set of resources. The apparatus may include means for transmitting DMRSs on either the first set of resources or the second set of resources based at least in part on a distance associated with the DMRSs.

Some aspects described herein relate to an apparatus for wireless communication. The apparatus may include means for determining a first set of resources and a second set of resources, wherein the second set of resources are associated with a smaller quantity of cyclic shifts in DMRSs than the first set of resources. The apparatus may include means for transmitting an indication of the first set of resources and an indication of the second set of resources.

Some aspects described herein relate to an apparatus for wireless communication. The apparatus may include means for receiving a configuration associated with DMRSs on a sidelink channel. The apparatus may include means for transmitting DMRSs that are staggered across symbols, include cyclic shift hopping across symbols, are denser than one DMRS per four REs, or a combination thereof.

Some aspects described herein relate to an apparatus for wireless communication. The apparatus may include means for determining a configuration associated with DMRSs on a sidelink channel, wherein the configuration is associated with DMRSs that are staggered across symbols, include cyclic shift hopping across symbols, are denser than one DMRS per four REs, or a combination thereof. The apparatus may include means for transmitting the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a first set of resources for feedback and an indication of a second set of resources for feedback, wherein the second set of resources are associated with a smaller quantity of cyclic shifts than the first set of resources, and transmit feedback on either the first set of resources or the second set of resources based at least in part on a distance associated with the feedback. Additionally, or alternatively, the communication manager 140 may determine a first set of resources for feedback and a second set of resources for feedback, wherein the second set of resources are associated with a smaller quantity of cyclic shifts than the first set of resources, and transmit an indication of the first set of resources and an indication of the second set of resources.

Additionally, or alternatively, the communication manager 140 may compute a timing advance associated with transmission of feedback and transmit feedback that is shifted in time according to the timing advance. Additionally, or alternatively, the communication manager 140 may transmit information associated with at least one distance threshold (e.g., to another UE) for long-range sidelink feedback and transmit an indication associated with a plurality of sets of minimum communication ranges (MCRs) (e.g., to the other UE). Additionally, or alternatively, the communication manager 140 may receive an indication of a first set of resources and an indication of a second set of resources, wherein the second set of resources are associated with a smaller quantity of cyclic shifts in demodulation reference signals (DMRSs) than the first set of resources, and transmit DMRSs on either the first set of resources or the second set of resources based at least in part on a distance associated with the DMRSs. Additionally, or alternatively, the communication manager 140 may determine a first set of resources and a second set of resources, wherein the second set of resources are associated with a smaller quantity of cyclic shifts in DMRSs than the first set of resources, and transmit an indication of the first set of resources and an indication of the second set of resources. Additionally, or alternatively, the communication manager 140 may receive a configuration associated with DMRSs on a sidelink channel and transmit DMRSs that are staggered across symbols, include cyclic shift hopping across symbols, are denser than one DMRS per four resource elements (REs), or a combination thereof. Additionally, or alternatively, the communication manager 140 may determine a configuration associated with DMRSs on a sidelink channel, wherein the configuration is associated with DMRSs that are staggered across symbols, include cyclic shift hopping across symbols, are denser than one DMRS per four REs, or a combination thereof, and transmit the configuration. Additionally, or alternatively, the communication manager 140 may perform one or more other operations described herein.

As indicated above, FIG. 1 is provided as an example. Other examples may differ from what is described with regard to FIG. 1.

Figure 2:
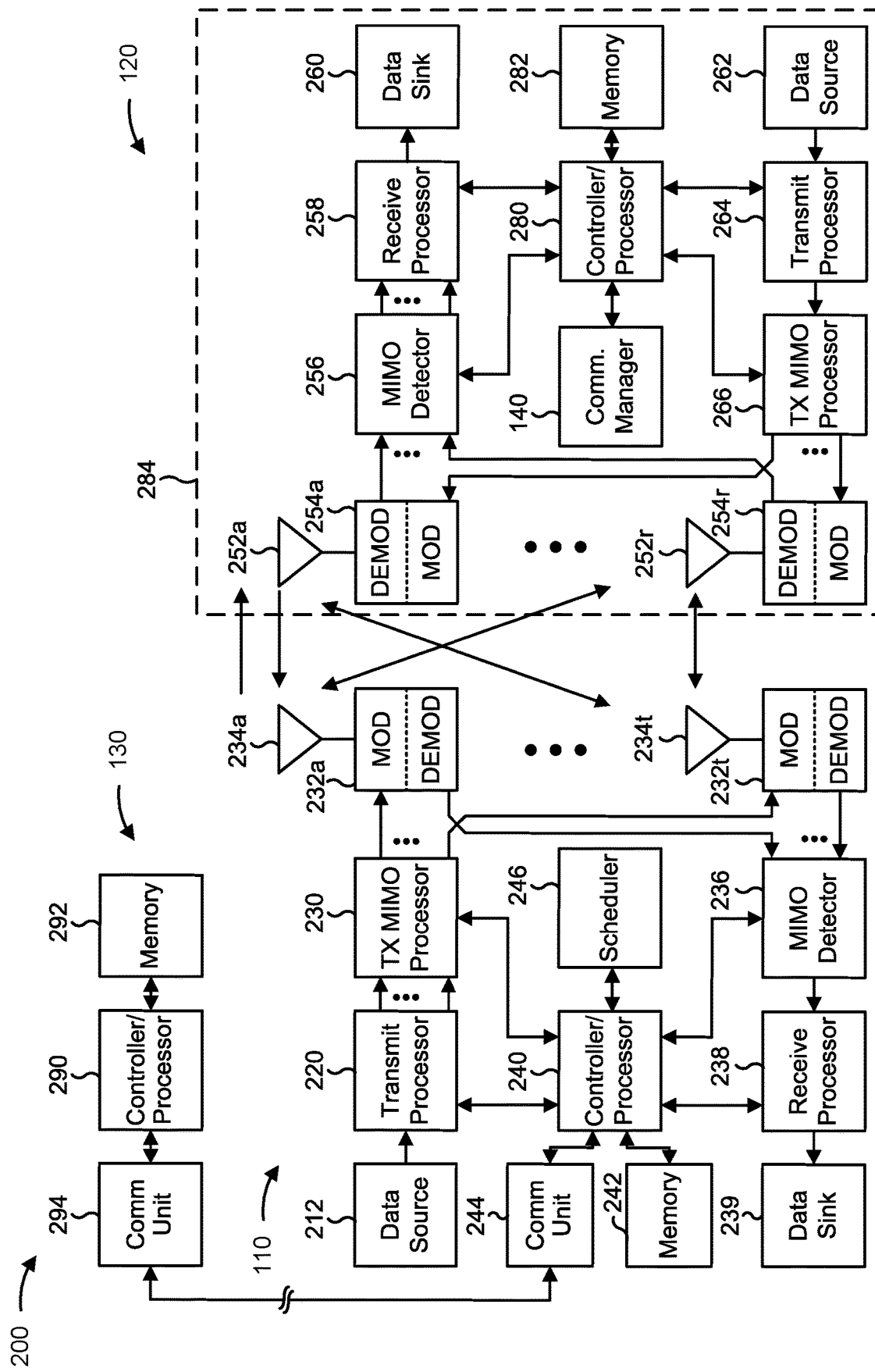
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-20).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-20).

The controller/processor 240 of the base station 110, the controller/processor 280 of the UE 120, and/or any other component(s) of FIG. 2 may perform one or more techniques associated with configuring and using sidelink feedback resources, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, and/or other processes as described herein. In some examples, executing instructions may include running the instructions, converting the instructions, compiling the instructions, and/or interpreting the instructions, among other examples. In some aspects, the mobile station described herein is the UE 120, is included in the UE 120, or includes one or more components of the UE 120 shown in FIG. 2.

In some aspects, a mobile station (e.g., the UE 120 and/or apparatus 2000 of FIG. 20) may include means for receiving an indication of a first set of resources for feedback and an indication of a second set of resources for feedback, wherein the second set of resources are associated with a smaller quantity of cyclic shifts than the first set of resources; and/or means for transmitting feedback on either the first set of resources or the second set of resources based at least in part on a distance associated with the feedback. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282. Additionally, or alternatively, the mobile station may include means for determining a first set of resources for feedback and a second set of resources for feedback, wherein the second set of resources are associated with a smaller quantity of cyclic shifts than the first set of resources; and/or means for transmitting an indication of the first set of resources and an indication of the second set of resources. Additionally, or alternatively, the mobile station may include means for computing a timing advance associated with transmission of feedback; and/or means for transmitting feedback that is shifted in time according to the timing advance. Additionally, or alternatively, the mobile station includes means for transmitting information associated with at least one distance threshold, to a receiving mobile station, for long-range sidelink feedback; and/or means for transmitting an indication associated with a plurality of sets of MCRs to the receiving mobile station. Additionally, or alternatively, the mobile station may include means for receiving an indication of a first set of resources and an indication of a second set of resources, wherein the second set of resources are associated with a smaller quantity of cyclic shifts in DMRSs than the first set of resources; and/or means for transmitting DMRSs on either the first set of resources or the second set of resources based at least in part on a distance associated with the DMRSs. Additionally, or alternatively, the mobile station may include means for determining a first set of resources and a second set of resources, wherein the second set of resources are associated with a smaller quantity of cyclic shifts in DMRSs than the first set of resources; and/or means for transmitting an indication of the first set of resources and an indication of the second set of resources. Additionally, or alternatively, the mobile station may include means for receiving a configuration associated with DMRSs on a sidelink channel; and/or means for transmitting DMRSs that are staggered across symbols, include cyclic shift hopping across symbols, are denser than one DMRS per four REs, or a combination thereof. Additionally, or alternatively, the mobile station may include means for determining a configuration associated with DMRSs on a sidelink channel, wherein the configuration is associated with DMRSs that are staggered across symbols, include cyclic shift hopping across symbols, are denser than one DMRS per four REs, or a combination thereof, and/or means for transmitting the configuration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
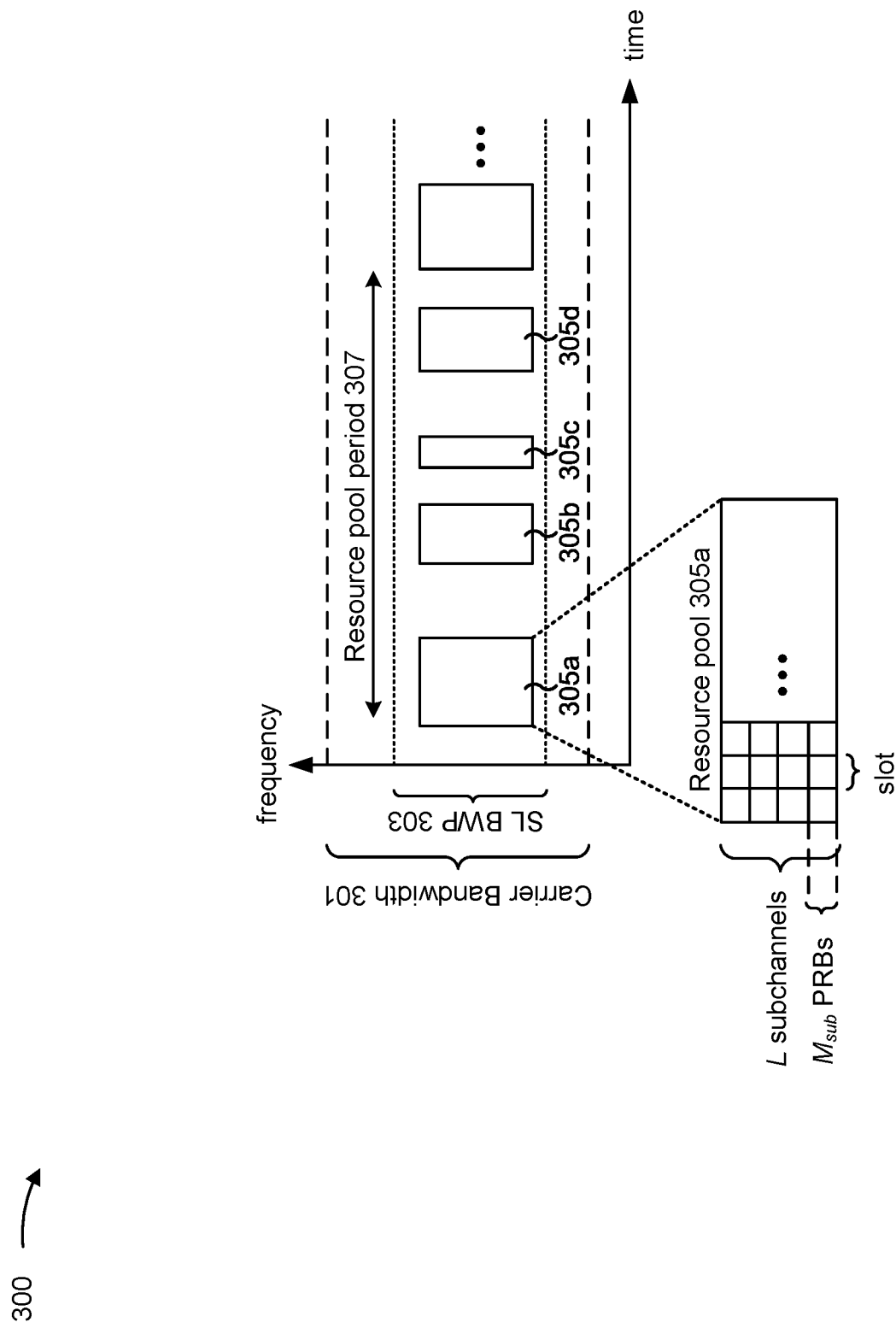
FIG. 3 is a diagram illustrating an example of resource pools for sidelink communications, in accordance with the present disclosure.

FIG. 3 is a diagram illustrating an example 300 of resource pools for sidelink communications, in accordance with the present disclosure. Example 300 applies to mobile stations, such as unmanned aerial vehicles (UAVs), UEs 120, or other mobile devices, communicating with each other on a sidelink channel.

As shown in FIG. 3, the mobile stations may communicate using frequencies within a carrier bandwidth 301, where the carrier bandwidth 301 includes a bandwidth part (BWP) 303 for the sidelink (SL) channel between the mobile stations. As used herein, "bandwidth part" or "BWP" refers to a contiguous set of physical resource blocks (PRBs), where each PRB includes a set of frequencies corresponding to one or more subcarriers. A "subcarrier" may refer to a frequency based at least in part on a "carrier" frequency (e.g., a frequency at or near a center of the carrier bandwidth 301), and subcarriers may be aggregated to convey information wirelessly (e.g., using OFDM symbols and/or other radio frequency (RF) symbols).

As further shown in FIG. 3, the SL BWP 303 may include a plurality of resource pools. Example 300 includes resource pools 305a, 305b, 305c, and 305d. Other aspects may include fewer resources pools (e.g., three resources pools, two resource pools, or one resource pool) or additional resource pools (e.g., five resource pools, six resource pools, and so on). The mobile stations may determine the resource pools 305a, 305b, 305c, and 305d autonomously (e.g., during mode 2 sidelink operation, as defined in 3GPP specifications and/or another standard). As an alternative, a network (e.g., via base station 110) may determine the resource pools 305a, 305b, 305c, and 305d (e.g., during mode 1 sidelink operation, as defined in 3GPP specifications and/or another standard). In some aspects, the resource pools are periodic. For example, as shown in FIG. 3, the resource pools 305a, 305b, 305c, and 305d repeat in time according to resource pool period 307.

As shown in FIG. 3, each resource pool includes one or more subchannels (e.g., L subchannels in example 300), and each subchannel includes one or more PRBs (e.g., $M_{sub}$ PRBs in example 300). Additionally, each resource pool spans one or more slots across time. As used herein, "slot" refers to a portion of a radio frame (or part of a frame, such as a subframe) within an LTE, 5G, or other wireless communication structure. In some aspects, a slot may include one or more symbols, where "symbol" may refer to an OFDM symbol or other similar symbol within a slot.

As indicated above, FIG. 3 is provided as an example. Other examples may differ from what is described with respect to FIG. 3.

Figure 4:
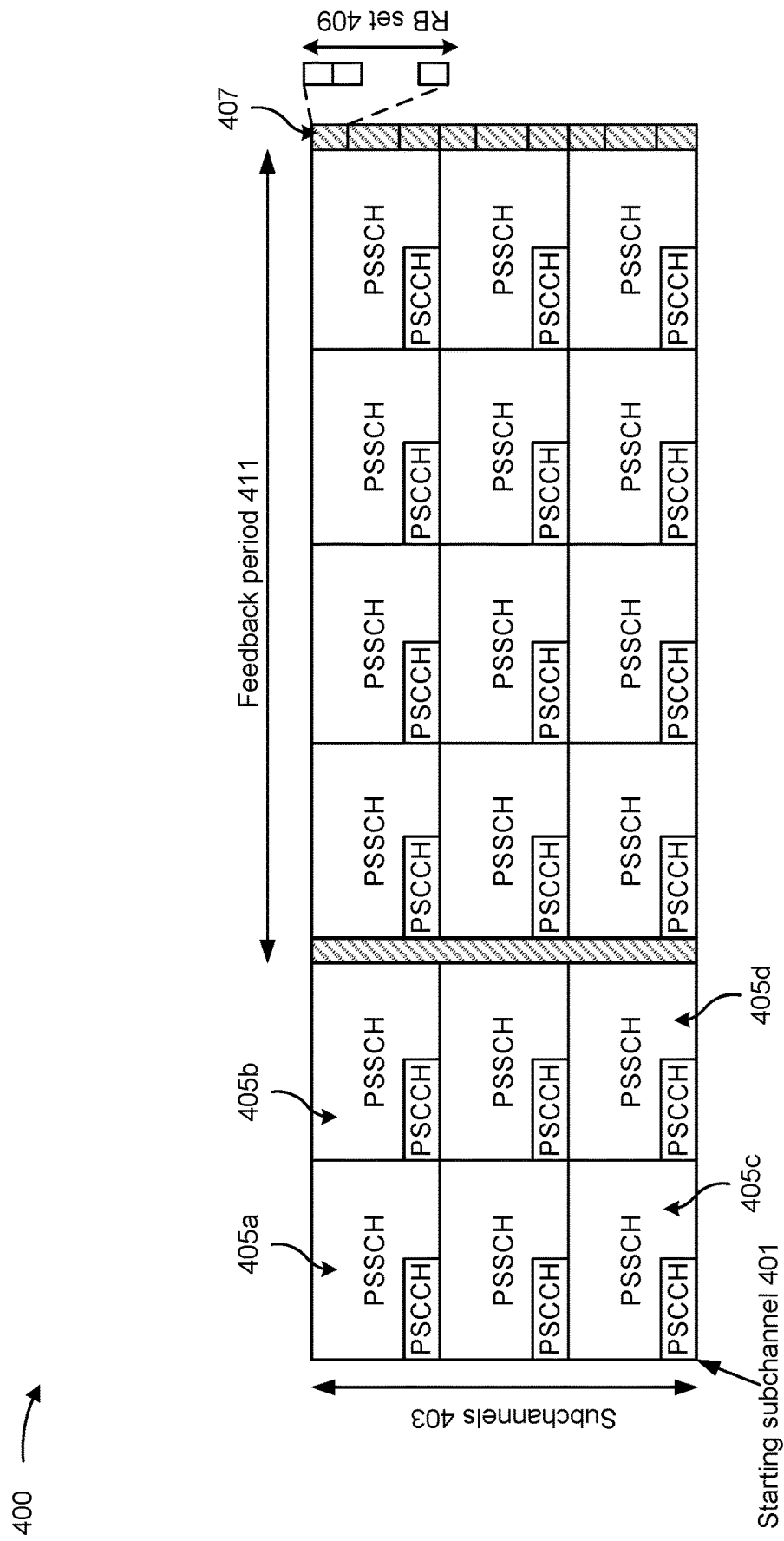
FIG. 4 is a diagram illustrating an example of resources for sidelink feedback, in accordance with the present disclosure.

FIG. 4 is a diagram illustrating an example 400 of resources for sidelink feedback, in accordance with the present disclosure. As shown in FIG. 4, a plurality of subchannels 403 from a starting subchannel 401 are allocated for sidelink communications between mobile stations (e.g., by the mobile stations during mode 2 sidelink operation or by a network during mode 1 sidelink operation). Each slot within a subchannel (e.g., slots 405a and 405b on a third subchannel, slots 405c and 405d on a first subchannel, or other slots shown in FIG. 4) may be divided between a control channel (e.g., a physical sidelink control channel (PSCCH)) and a data channel (e.g., a physical sidelink shared channel (PSSCH)).

As further shown in FIG. 4, one or more symbols 407 may be allocated for feedback (e.g., hybrid automatic repeat request (HARQ) feedback) between the mobile stations. Additionally, different resource block (RB) sets (e.g., RB set 409) may be associated with different subchannels and/or slots, such that a mobile station may determine to which transmission feedback relates based on which RB set the feedback is received in. In some aspects, the symbols allocated for feedback are periodic. For example, as shown in FIG. 4, the symbol(s) 407 repeat in time according to feedback period 411.

Currently, a mobile station selects cyclic shift to apply to feedback signals (e.g., acknowledgement (ACK) or negative-acknowledgement (NACK) signals) from up to six possible cyclic shifts, based on rules defined in 3GPP specifications. However, propagation of feedback signals over long distances results in propagation delays that may be longer than differences between the possible cyclic shifts. For example, with six possible cyclic shifts, a mobile station receiving feedback may be unable to distinguish cyclic shifts beyond 415 meters, assuming free space propagation. As a result, mobile stations are unable to exchange accurate feedback and therefore waste power, processing resources, and network resources when transmitting and receiving feedback.

Some techniques and apparatuses described herein enable a mobile station to transmit feedback in resources dedicated for long-range feedback and/or to apply timing advances to feedback to compensate for propagation delay. As a result, a mobile station receiving the feedback is able to accurately decode the feedback, which keeps power, processing resources, and network resources from being wasted. Additionally, the mobile station receiving the feedback is able to accurately determine whether to retransmit communications to the mobile station transmitting the feedback. As a result, reliability of communications between the mobile stations is improved.

As indicated above, FIG. 4 is provided as an example. Other examples may differ from what is described with regard to FIG. 4.

Figure 5:
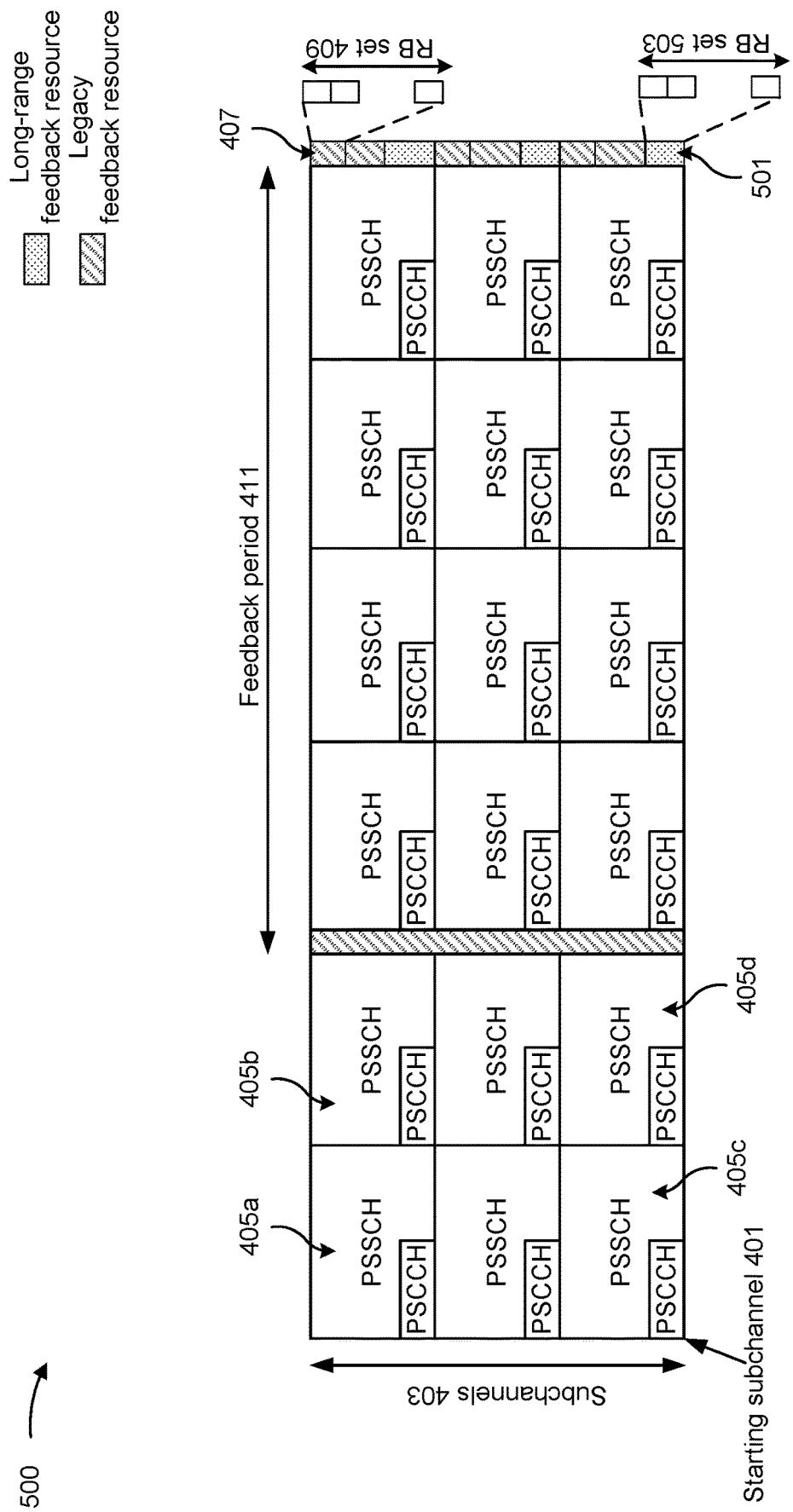
FIG. 5 is a diagram illustrating an example associated with resources for long-range sidelink feedback, in accordance with the present disclosure.

FIG. 5 is a diagram illustrating an example 500 associated with resources for long-range sidelink feedback, in accordance with the present disclosure. As shown in FIG. 5, example 500 a plurality of subchannels 403 from a starting subchannel 401 are allocated for sidelink communications between mobile stations (e.g., by the mobile stations during mode 2 sidelink operation or by a network during mode 1 sidelink operation). Each slot within a subchannel (e.g., slots 405a and 405b on a third subchannel, slots 405c and 405d on a first subchannel, or other slots shown in FIG. 4) may be divided between a control channel (e.g., a PSCCH) and a data channel (e.g., a PSSCH).

As shown in FIG. 5, one or more symbols may be allocated for feedback (e.g., HARQ feedback) between the mobile stations. Additionally, different RB sets (e.g., RB set 409) may be associated with different subchannels and/or slots, such that a mobile station may determine to which transmission feedback relates based on which RB set the feedback is received in. In some aspects, the symbols allocated for feedback are periodic. For example, as shown in FIG. 4, the symbol(s) repeat in time according to feedback period 411.

As further shown in FIG. 5, a Tx mobile station may divide resources for feedback between a set of legacy resources 407 and a set of long-range resources 501. The long-range resources (e.g., RB set 503) may be associated with a smaller quantity of cyclic shifts than the legacy resources (e.g., RB set 409). For example, the Tx mobile station may use an sl-NumMuxCS-PairLongRange data structure (e.g., to be defined in 3GPP specifications and/or another standard) to indicate the smaller quantity of cyclic shifts to be used in the long-range resources. Accordingly, a receiving (Rx) mobile station uses fewer possible cyclic shifts when transmitting in the long-range resources such that the Tx mobile station may properly decode the feedback despite large propagation delay.

In some aspects, the indication of the long-range resources may include a bitmap. For example, the indication may include an sl-PSFCH-LongRangeRB-Set data structure (e.g., to be defined in 3GPP specifications and/or another standard) that indicates which RB sets, of the plurality of RB sets allocated for feedback, are long-range resources.

In some aspects, the set of long-range resources is associated with a different period than a period associated with the set of legacy resources. For example, in FIG. 5, the feedback period 411 is such that feedback is transmitted after every four slots. However, the feedback period associated with the set of long-range resources may be longer such that feedback is transmitted in the set of long-range resources after every other feedback period 411, after every third feedback period 411, or so on. For example, the Tx mobile station may use an sl-PSFCH-LongRangePeriod data structure (e.g., to be defined in 3GPP specifications and/or another standard) to indicate the larger period associated with the set of long-range resources.

Accordingly, the Rx mobile station may determine whether to transmit feedback in the set of long-range resources or in the set of legacy resources based at least in part on a distance associated with the feedback. For example, the Rx mobile station may determine the distance as described in connection with FIG. 6. The distance may include a three-dimensional distance between the mobile stations and/or a relative height between the mobile stations.

By using techniques as described in connection with FIG. 5, the Rx mobile station transmits feedback in resources dedicated for long-range feedback (e.g., in the RB set 503). As a result, the Tx mobile station is able to accurately decode the feedback, which keeps power, processing resources, and network resources from being wasted. Additionally, the Tx mobile station is able to accurately determine whether to retransmit communications to the Rx mobile station. As a result, reliability of communications between the mobile stations is improved.

As indicated above, FIG. 5 is provided as an example. Other examples may differ from what is described with respect to FIG. 5.

Figure 6:
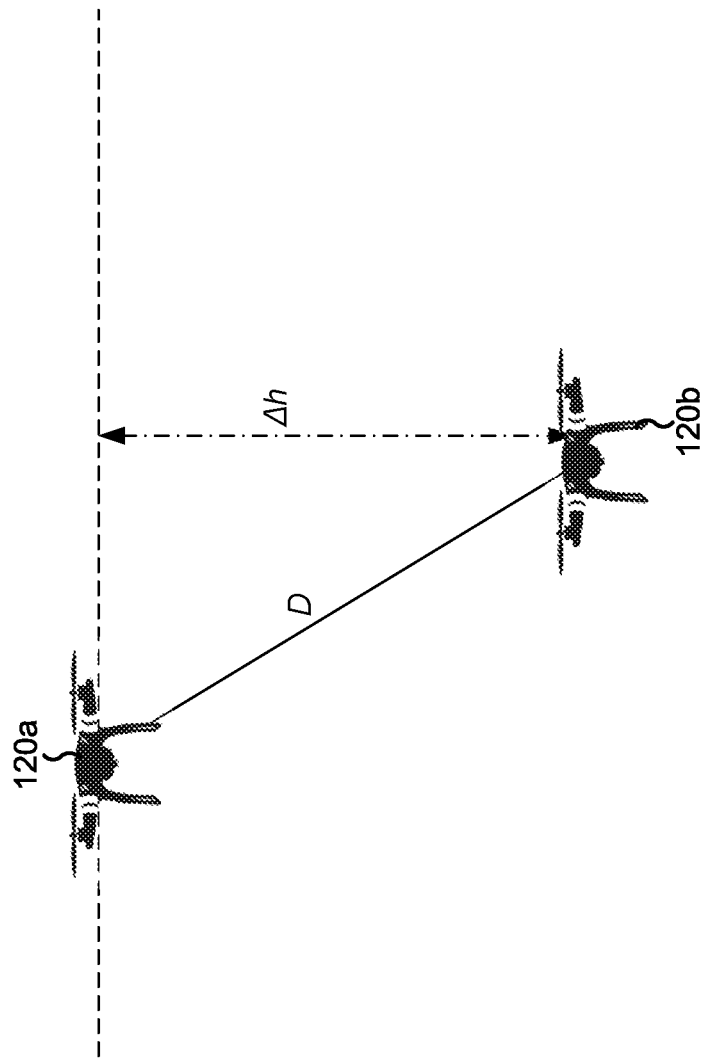
FIG. 6 is a diagram illustrating an example associated with triggers for long-range sidelink feedback, in accordance with the present disclosure.

FIG. 6 is a diagram illustrating an example 600 associated with triggers for long-range sidelink feedback, in accordance with the present disclosure. As shown in FIG. 6, example 600 includes a first mobile station (e.g., UE 120a) and a second mobile station (e.g., UE 120b). The UE 120a is sending a transmission over-the-air (OTA) to the second UE 120b and will receive feedback based on whether the second UE 120b successfully receives and decodes the transmission.

The second UE 120b may determine whether to use long-range resources to transmit the feedback (e.g., as described in connection with FIG. 5) and/or apply a timing advance to the feedback (e.g., as described in connection with FIG. 7) based at least in part on a three-dimensional distance (e.g., represented by D in example 600) between the first UE 120a and the second UE 120b. For example, the second UE 120b may apply a distance threshold to make the determination. The distance threshold may be programmed (and/or otherwise preconfigured) into the second UE 120*b* (e.g., according to 3GPP specifications and/or another standard), indicated by the first UE 120*a*, or selected from a plurality of distance thresholds (e.g., programmed and/or otherwise preconfigured into the second UE 120*b*, according to 3GPP specifications and/or another standard) by the first UE 120*a* and/or the second UE 120*b*.

To determine the three-dimensional distance, the first UE 120*a* may include a zone identifier (ID) associated with the first UE 120*a* as well as a height of the first UE 120*a* in sidelink control information (SCI) associated with the transmission. For example, "zone ID" may include any numerical identification of a two-dimensional geographic zone in which the first UE 120*a* is located and that is unique within a set of zone IDs used by the first UE 120*a* and the second UE 120*b*. In some aspects, a zone ID may be assigned by the first UE 120*a* and indicated to the second UE 120*b*. As an alternative, a zone ID may be calculated using coordinates (e.g., global positioning system (GPS) coordinates and/or coordinates with respect to another set of reference axes) that are on one or more boundaries of the geographic zone and/or included in the geographic zone. For example, the zone ID may be calculated using a formula defined in 3GPP specifications and/or another standard.

In some aspects, the first UE 120*a* may include the zone ID and the height in second stage SCI (SCI-2). Accordingly, the second UE 120*b* may estimate the distance based at least in part on the zone ID and the height. In some aspects, the first UE 120*a* indicates an absolute height value. As an alternative, the first UE 120*a* transmits an index associated with one height interval from a plurality of height intervals (e.g., included in a table or other similar data structure in an SL-ResourcePool data structure, as defined in 3GPP specifications and/or another standard). As used herein, "height interval" refers to a quantization of a height value. For example, the first UE 120*a* may round the height value according to a set of quantized values (the plurality of height intervals), such that a height of 55 feet and a height of 60 feet are rounded to 50 feet while a height of 65 feet and a height of 70 feet are rounded to 75 feet. In another example, the first UE 120*a* may apply a floor function or a ceiling function to quantize the height value (e.g., such that a height of 55 feet and a height of 65 feet are floored to 50 feet while a height of 76 feet and a height of 79 feet are floored to 75 feet or such that a height of 55 feet and a height of 65 feet are ceilinged to 75 feet while a height of 76 feet and a height of 79 feet are ceilinged to 100 feet). Although described using examples with evenly spaced intervals, the first UE 120*a* may alternatively quantize the height value using unevenly spaced intervals.

As an alternative, the first UE 120*a* may include a three-dimensional zone ID associated with the first UE 120*a* in SCI associated with the transmission. For example, "three-dimensional zone ID" may include any numerical identification of a two-dimensional geographic zone and a height range associated with first UE 120*a* and that is unique within a set of three-dimensional zone IDs used by the first UE 120*a* and the second UE 120*b*. In some aspects, a three-dimensional zone ID may be assigned by the first UE 120*a* and indicated to the second UE 120*b*. As an alternative, a three-dimensional zone ID may be calculated using coordinates (e.g., GPS coordinates and/or coordinates with respect to another set of reference axes) that are on one or more boundaries of the geographic zone and/or included in the geographic zone. For example, the three-dimensional zone ID may be calculated using a formula defined in 3GPP specifications and/or another standard. Additionally, a three-dimensional zone ID may be calculated using a height range associated with the geographical zone. Accordingly, the second UE 120*b* may estimate the distance based at least in part on the zone ID.

To determine a distance between the first UE 120*a* and the second UE 120*b*, the second UE 120*b* may determine a location of the second UE 120*b* (e.g., using triangulation, GPS, and/or another technique associated with determining a location of a mobile device) and estimate a distance from the location of the second UE 120*b* to a three-dimensional geographic zone (based on a zone ID and a height or based on a three-dimensional zone ID) associated with the first UE 120*a*. To apply the distance threshold, the second UE 120*b* may determine a maximum distance between the location of the second UE 120*b* and the three-dimensional geographic zone associated with the first UE 120*a*, a minimum distance between the location of the second UE 120*b* and the three-dimensional geographic zone associated with the first UE 120*a*, a median distance between the location of the second UE 120*b* and the three-dimensional geographic zone associated with the first UE 120*a*, an average distance between the location of the second UE 120*b* and the three-dimensional geographic zone associated with the first UE 120*a*, and/or otherwise select one of the distances from the location of the second UE 120*b* to a point in the three-dimensional geographic zone associated with the first UE 120*a*.

Additionally, or alternatively, the second UE 120*b* may receive a DMRS from the first UE 120*a* (e.g., encoded with the transmission and/or SCI associated with the transmission). Accordingly, the second UE 120*b* may estimate the distance based at least in part on the DMRS. For example, the second UE 120*b* may detect a phase shift in the DMRS caused by the propagation delay and estimate the distance accordingly.

In some aspects, the second UE 120*b* transmits feedback to the first UE 120*a* when within an MCR. For example, "MCR" may include a distance threshold within which any UEs should attempt to decode sidelink signals from the first UE 120*a* and transmit feedback to the first UE 120*a* associated with the sidelink signals.

In some aspects, when the transmission is a groupcast from the first UE 120*a*, the first UE 120*a* may indicate an MCR (e.g., using an sl-ZoneConfigMCR-Index variable in SCI associated with the transmission that maps to a table or other similar data structure in an SL-ResourcePool data structure, as defined in 3GPP specifications and/or another standard) such that the second UE 120*b* transmits feedback when the second UE 120*b* is within the MCR. As used herein, "within the MCR" refers to when a distance between the second UE 120*b* and the first UE 120*a* is less than (or, in some aspects, equal to) the MCR.

In some aspects, the first UE 120*a* may select from a different set of MCRs when at a smaller relative height difference with the second UE 120*b* (e.g. represented by Δh in example 600) as compared with a larger relative height difference. For example, larger MCRs may be useful for larger relative height differences because signals are less likely to be blocked or otherwise experience interference. Accordingly, the first UE 120*a* may indicate multiple sets of MCRs in an SL-ResourcePool data structure, as defined in 3GPP specifications and/or another standard, where each set of MCRs is associated with a different relative height (or interval of relative heights). Accordingly, the first UE 120*a* and/or the second UE 120*b* may select an MCR from the set of MCRs corresponding to Δh between the first UE 120*a* and the second UE 120*b*. The second UE 120*b* may therefore determine whether to transmit the feedback based at least in part on the selected MCR. Similarly, the first UE 120*a* and/or the second UE 120*b* may select a distance threshold from the set of distance thresholds based at least in part on Δh between the first UE 120*a* and the second UE 120*b*.

By using techniques as described in connection with FIG. 6, the Rx mobile station determines when to transmit feedback in resources dedicated for long-range feedback and/or when to apply timing advances to feedback to compensate for propagation delay. As a result, the Tx mobile station is able to accurately decode the feedback, which keeps power, processing resources, and network resources from being wasted. Additionally, the Tx mobile station is able to accurately determine whether to retransmit communications to the Rx mobile station. As a result, reliability of communications between the mobile stations is improved.

As indicated above, FIG. 6 is provided as an example. Other examples may differ from what is described with respect to FIG. 6.

Figure 7:
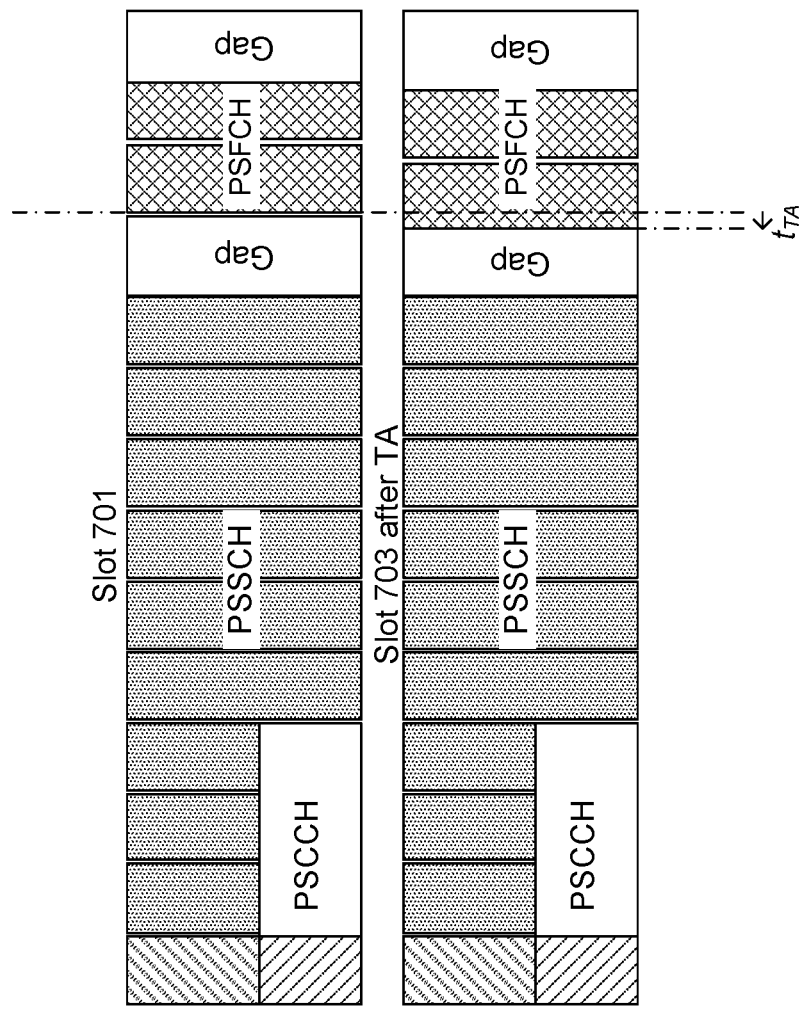
FIG. 7 is a diagram illustrating an example associated with timing advances for long-range sidelink feedback, in accordance with the present disclosure.

FIG. 7 is a diagram illustrating an example 700 associated with resources for long-range sidelink feedback, in accordance with the present disclosure. As shown in FIG. 7, example 700 includes a slot 701 that is divided between a sidelink control channel (e.g., a PSCCH), a sidelink data channel (e.g., a PSSCH), and a feedback channel (e.g., a PSFCH). In addition to, or in lieu of, using a reduced quantity of cyclic shifts such that feedback may be decoded over longer distances, an Rx mobile station may compute a timing advance (TA) associated with transmission of the feedback. For example, the Rx mobile station may estimate a distance to a Tx mobile station (e.g., as described in connection with FIG. 6) and determine the TA to apply based at least in part on the distance.

Accordingly, as shown by reference number 703, the Rx mobile station may transmit the feedback shifted in time according to the timing advance (e.g., represented by $t_{TA}$ in example 700). For example, the Rx mobile station may transmit the feedback earlier in time (e.g., before a scheduled end of a gap between a transmission, such as a PSSCH transmission in example 700). Accordingly, the Rx mobile station may account for the propagation delay of the feedback such that the Tx mobile station can still distinguish possible cyclic shifts for the feedback.

By using techniques as described in connection with FIG. 7, the Rx mobile station applies timing advances to feedback to compensate for propagation delay. As a result, the Tx mobile station is able to accurately decode the feedback, which keeps power, processing resources, and network resources from being wasted. Additionally, the Tx mobile station is able to accurately determine whether to retransmit communications to the Rx mobile station. As a result, reliability of communications between the mobile stations is improved.

As described above, examples 500 and 700 may be combined. For example, the Rx mobile station may apply a timing advance to the feedback and also transmit the feedback in a set of resources that are associated with fewer possible cyclic shifts.

As indicated above, FIG. 7 is provided as an example. Other examples may differ from what is described with respect to FIG. 7.

FIG. 8 is a diagram illustrating an example 800 associated with configuration of long-range sidelink feedback between mobile stations, in accordance with the present disclosure. As shown in FIG. 8, a UE 120*a* and a UE 120*b* may communicate with one another (e.g., on a sidelink).

As shown by reference number 805, a Tx UE (e.g., the UE 120*a*) may transmit, and an Rx UE (e.g., the UE 120*b*) may receive, a configuration associated with feedback from the Rx UE 120*b*. For example, as described in connection with FIG. 6, the configuration may include an indication of a first set of resources for feedback and a second set of resources for feedback, where the second set of resources are associated with a smaller quantity of cyclic shifts than the first set of resources. For example, the configuration may include an SL-PSFCH-Config data structure (e.g., as defined in 3GPP specifications and/or another standard) that indicates the first set of resources and the second set of resources.

Additionally, or alternatively, the configuration may include information associated with at least one distance threshold used to determine whether to use the first set of resources or the second set of resources for transmitting feedback and/or whether to apply a TA to feedback (e.g., as described in connection with FIG. 7). For example, the configuration may include an SL-ResourcePool data structure (e.g., as defined in 3GPP specifications and/or another standard) that indicates a single distance threshold or a plurality of distance thresholds from which the Rx UE 120*b* may select (e.g., based at least in part on a relative height difference, as described in connection with FIG. 6).

In some aspects, the configuration may further include an indication associated with a plurality of sets of MCRs (e.g., as described in connection with FIG. 6). For example, the configuration may include an SL-ResourcePool data structure (e.g., as defined in 3GPP specifications and/or another standard) that indicates a plurality of sets of MCRs from which the Tx UE 120*a* and/or the Rx UE 120*b* may select based at least in part on a relative height difference, as described in connection with FIG. 6.

As shown by reference number 810, the Tx UE 120*a* may transmit, and the Rx UE 120*b* may receive, data. For example, the Tx UE 120*a* may transmit the data on a PSSCH after scheduling the transmission with SCI on a PSCCH.

As shown by reference number 815, the Rx UE 120*b* may transmit, and the Tx UE 120*a* may receive, feedback associated with the data. For example, the Rx UE 120*b* may determine whether to transmit the feedback based at least in part on a selected MCR (e.g., as described in connection with FIG. 6). Additionally, the Rx UE 120*b* may determine whether to use the first set of resources or the second set of resources (e.g., as described in connection with FIG. 5) and/or whether to apply a TA (e.g., as described in connection with FIG. 7) based at least in part on a selected distance threshold. Accordingly, the Tx UE 120*a* is able to receive and accurately decode the feedback.

By using techniques as described in connection with FIG. 8, the Tx mobile station 120*a* configures the Rx mobile station 120*b* to transmit feedback in resources dedicated for long-range feedback and/or to apply timing advances to feedback to compensate for propagation delay. As a result, the Tx mobile station 120*a* is able to accurately decode the feedback, which keeps power, processing resources, and network resources from being wasted. Additionally, the Tx mobile station 120*a* is able to accurately determine whether to retransmit communications to the Rx mobile station 120*b*. As a result, reliability of communications between the mobile stations 120*a* and 120*b* is improved.

As indicated above, FIG. 8 is provided as an example. Other examples may differ from what is described with respect to FIG. 8.

Currently, a mobile station selects from three possible cyclic shifts to apply to DMRSs based on rules defined in 3GPP specifications. However, propagation of feedback signals over long distances results in propagation delays that may be longer than differences between the possible cyclic shifts. For example, with three possible cyclic shifts, a mobile station receiving a DMRS may be unable to distinguish cyclic shifts beyond 825 meters, assuming free space propagation. As a result, mobile stations may suffer reduced quality and reliability of communications by being unable to properly demodulate and decode transmissions using DMRSs. This wastes power, processing resources, and network resources.

Some techniques and apparatuses described herein enable a transmitting mobile station to transmit DMRSs in resources dedicated for long-range DMRSs and/or to use staggering across symbols, hopping across symbols, and/or a greater density than one DMRS per four REs to compensate for propagation delay. As a result, a receiving mobile station is able to use the DMRSs for more accurate decoding, which keeps power, processing resources, and network resources from being wasted. Additionally, quality of communications between the mobile stations is improved.

Figure 9A:
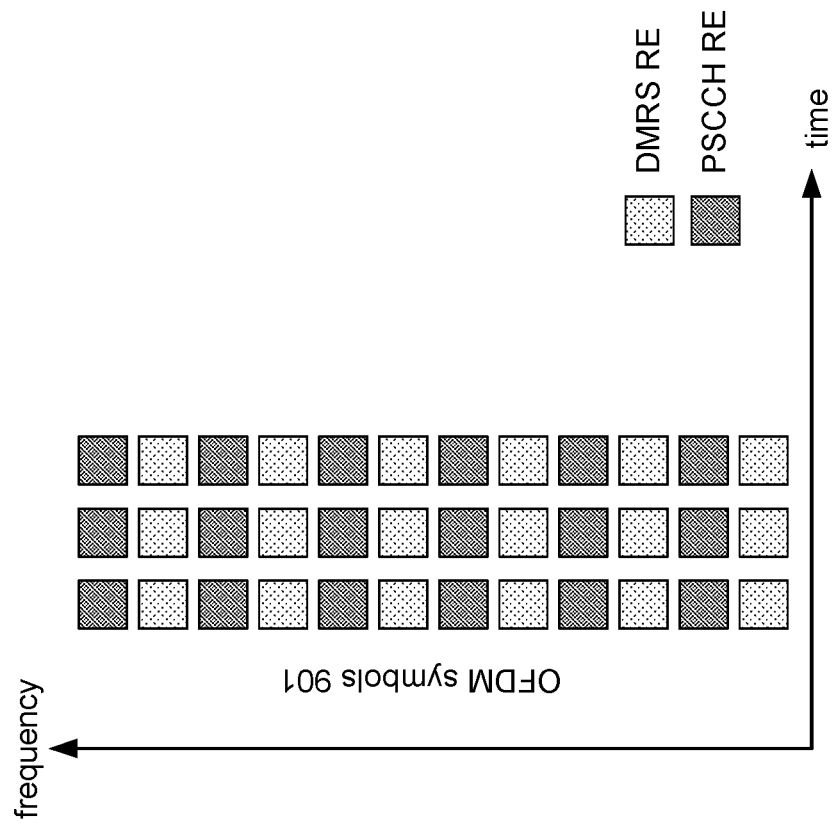
FIGS. 9A and 9B are diagrams illustrating examples associated with demodulation reference signal (DMRS) density and staggering, in accordance with the present disclosure.
Figure 9B:
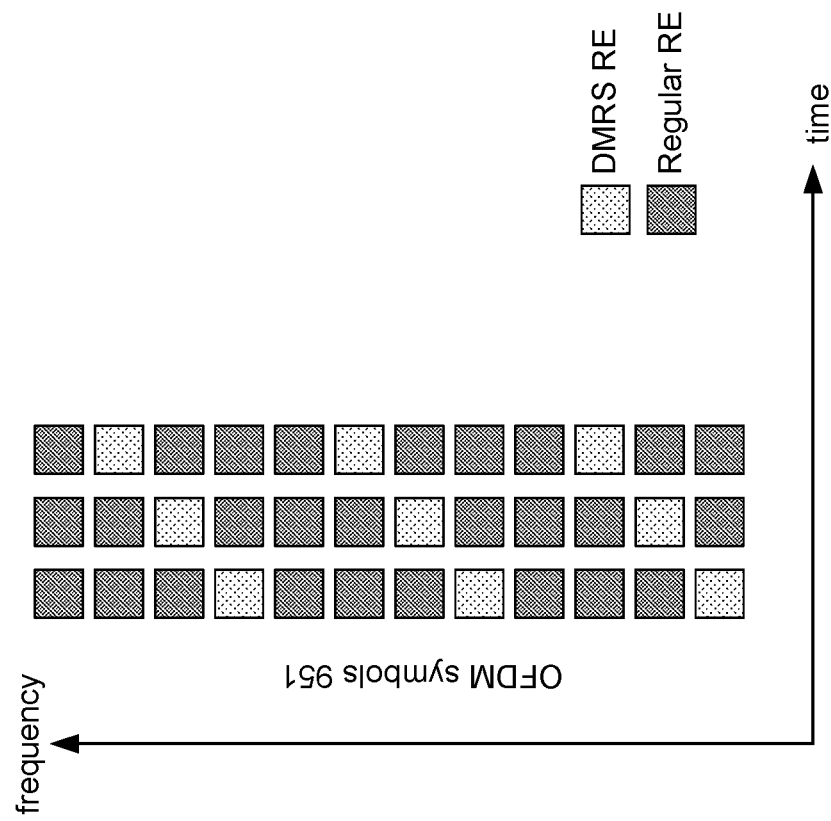

FIGS. 9A and 9B are diagrams illustrating examples 900 and 950, respectively, associated with density and staggering of DMRSs, in accordance with the present disclosure. As shown in FIG. 9A, example 900 includes a set of OFDM symbols 901 that include DMRSs with a density greater than one DMRS per four REs in frequency. By using greater than one DMRS per four REs in frequency, a Tx mobile station enables an Rx mobile station to distinguish between DMRSs from the Tx mobile station and DMRSs from other mobile stations at a longer range proportionate with the increase in density.

Additionally, or alternatively, as shown in FIG. 9B, example 950 includes a set of OFDM symbols 951 that include DMRSs that are staggered across symbols. For example, in a first symbol, a Tx mobile station encodes DMRSs in a first RBs, a fifth RB, and a ninth RB; in a second symbol, the Tx mobile station encodes DMRSs in a second RB, a sixth RB, and a tenth RB; and, in a third symbol, the Tx mobile station encodes DMRSs in a third RB, a seventh RB, and an eleventh RB. By staggering the DMRSs, the Tx mobile station enables an Rx mobile station to distinguish between DMRSs from the Tx mobile station and DMRSs from other mobile stations at a longer range.

In order to use a greater density and/or staggering across symbols, the Rx mobile station may transmit, and the Tx mobile station may receive, a configuration associated with DMRSs that indicates a density to use and/or a pattern for staggering such that the Rx mobile station may successfully demodulate and decode data from the Tx mobile station using the increased density and/or the pattern of staggered DMRSs.

By using techniques as described in connection with FIGS. 9A and/or 9B, a Tx mobile station uses staggering across symbols and/or a greater density than one DMRS per four REs to compensate for propagation delay. As a result, an Rx mobile station is able to use the DMRSs for more accurate decoding, which keeps power, processing resources, and network resources from being wasted. Additionally, quality of communications between the mobile stations is improved.

As indicated above, FIGS. 9A and 9B are provided as examples. Other examples may differ from what is described with respect to FIGS. 9A and 9B.

Figure 10:
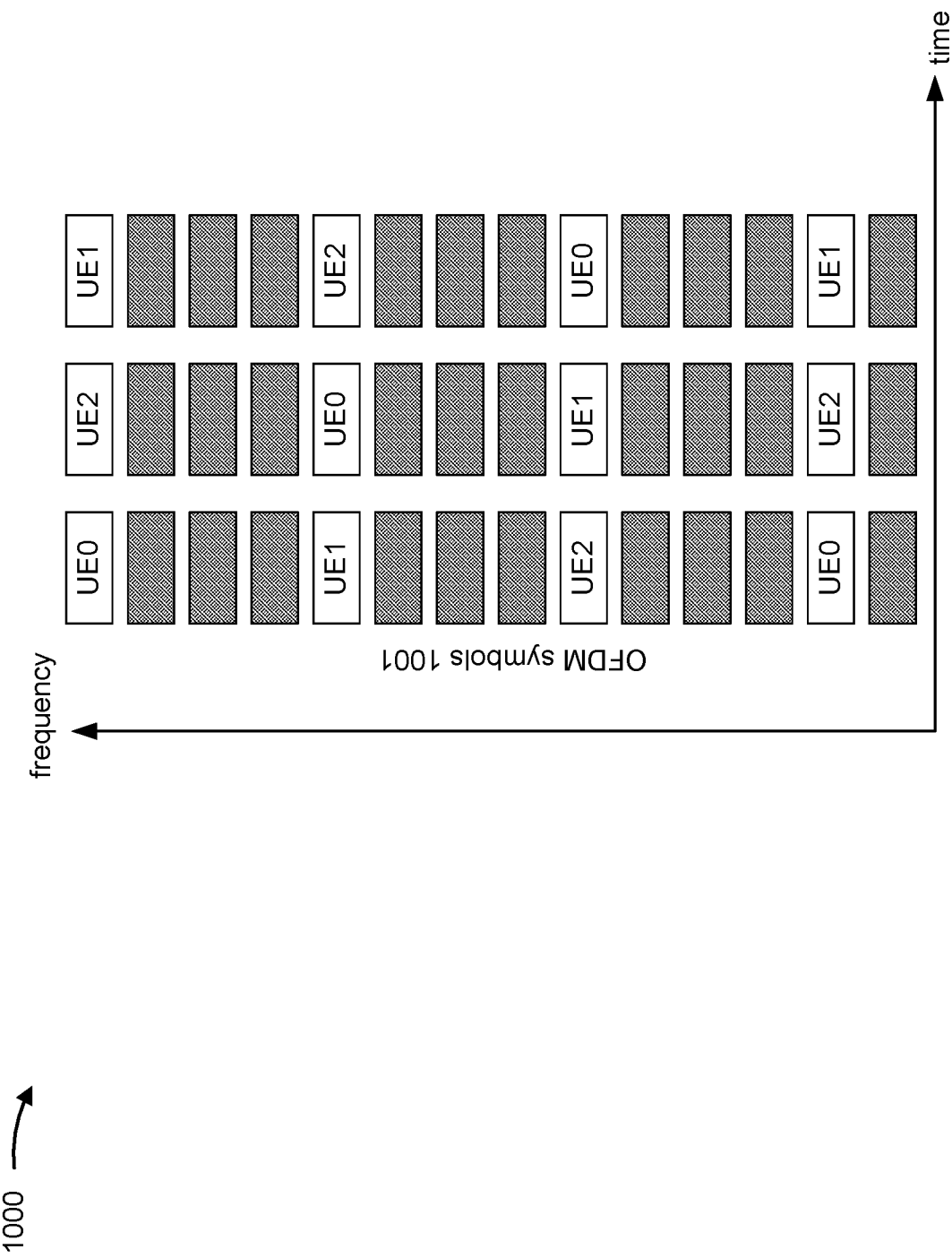
FIG. 10 is a diagram illustrating an example associated with DMRS hopping across symbols, in accordance with the present disclosure.

FIG. 10 is a diagram illustrating an example 1000 associated with DMRS hopping across symbols, in accordance with the present disclosure. As shown in FIG. 10, example 1000 includes a set of OFDM symbols 1001 that include DMRSs that are hopped across symbols. In example 1000, a first Tx mobile station (shown as "UE0") encodes DMRSs in a second RB and a fourteenth RB in a first symbol, in a tenth RB in a second symbol, and in a sixth RB in a third symbol. Similarly, a second Tx mobile station (shown as "UE1") encodes DMRSs in a tenth RB in the first symbol, in a sixth RB in the second symbol, and in a second RB and a fourteenth RB in the third symbol. Similarly, a third Tx mobile station (shown as "UE2") encodes DMRSs in a sixth RB in the first symbol, in a second RB and a fourteenth RB in the second symbol, and in a tenth RB in the third symbol. By hopping the DMRSs, the Tx mobile stations enable an Rx mobile station to distinguish between DMRSs from different mobile stations at a longer range. For example, the Rx mobile station may coherently combine across the three symbols to perform decoding. Although described using three mobile stations and three symbols, other aspects may include additional mobile stations (e.g., four mobile stations, five mobile stations, and so on) and/or additional symbols (e.g., four symbols, five symbols, and so on).

As an alternative, the Tx mobile stations may hop the DMRSs across symbols according to a pattern such that the Rx mobile station may determine cyclic shifts associated with the DMRSs based at least in part on the pattern. For example, the Rx mobile station may determine that a first pattern of cyclic shifts (e.g., applying cyclic shift 1 in a first symbol, applying cyclic shift 1 in a second symbol, and applying cyclic shift 2 in a third symbol) is associated with an overall cyclic shift 1; a second pattern of cyclic shifts (e.g., applying cyclic shift 2 in a first symbol, applying cyclic shift 3 in a second symbol, and applying cyclic shift 3 in a third symbol) is associated with an overall cyclic shift 2; and a third pattern of cyclic shifts (e.g., applying cyclic shift 3 in a first symbol, applying cyclic shift 2 in a second symbol, and applying cyclic shift 1 in a third symbol) is associated with an overall cyclic shift 3. By hopping the DMRSs, the Tx mobile stations enable an Rx mobile station to determine an overall cyclic shift for DMRSs from different mobile stations at a longer range. Although described using three symbols, other aspects may include additional symbols (e.g., four symbols, five symbols, and so on).

In order to use hopping across symbols, the Rx mobile station may transmit, and the Tx mobile station may receive, a configuration associated with DMRSs that indicates a pattern for hopping such that the Rx mobile station may successfully demodulate and decode data from the Tx mobile station using the pattern of hopped DMRSs.

By using techniques as described in connection with FIG. 10, a Tx mobile station uses hopping across symbols to compensate for propagation delay. As a result, an Rx mobile station is able to use the DMRSs for more accurate decoding, which keeps power, processing resources, and network resources from being wasted. Additionally, quality of communications between the mobile stations is improved.

As indicated above, FIG. 10 is provided as an example. Other examples may differ from what is described with respect to FIG. 10.

Figure 11:
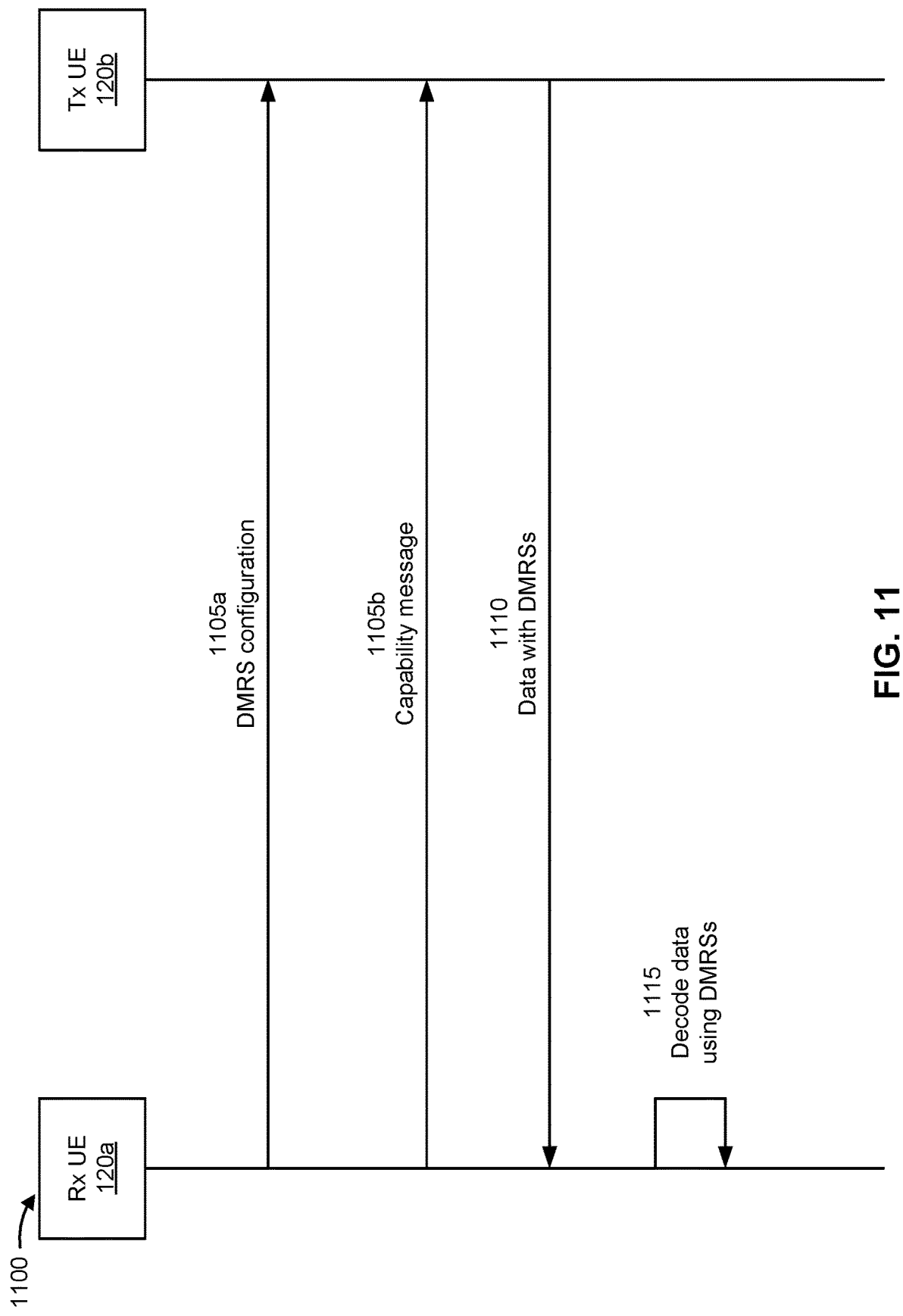
FIG. 11 is a diagram illustrating an example associated with configuration of DMRSs between mobile stations, in accordance with the present disclosure.

FIG. 11 is a diagram illustrating an example 1100 associated with configuration of DMRSs between mobile stations, in accordance with the present disclosure. As shown in FIG. 11, a UE 120a and a UE 120b may communicate with one another (e.g., on a sidelink).

As shown by reference number 1105a, an Rx UE (e.g., the UE 120a) may transmit, and a Tx UE (e.g., the UE 120b) may receive, a configuration associated with DMRSs on the sidelink channel. In some aspects, the configuration may include an indication of a first set of resources and an indication of a second set of resources, where the second set of resources are associated with a smaller quantity of cyclic shifts in DMRSs than the first set of resources.

In some aspects, the first set of resources includes a first resource pool, and the second set of resources includes a second resource pool. For example, the configuration may include an SL-ResourcePool data structure (e.g., as defined in 3GPP specifications and/or another standard) that indicates the first set of resources and an SL-ResourcePool data structure (e.g., as defined in 3GPP specifications and/or another standard) that indicates the second set of resources. Additionally, the configuration may include an sl-NumCyclicShifts parameter (e.g., to be defined in 3GPP specifications and/or another standard) that indicates a quantity of cyclic shifts for DMRSs in the first set of resources and an sl-NumCyclicShifts parameter (e.g., to be defined in 3GPP specifications and/or another standard) that indicates a quantity of cyclic shifts for DMRSs in the second set of resources.

As an alternative, the first set of resources includes a first subchannel, and the second set of resources includes a second subchannel. For example, the configuration may be programmed (and/or otherwise preconfigured) into the Rx UE 120a and the Tx UE 120b or may be included in system information block (SIB) (such as SIB-12, as defined in 3GPP specifications). As an alternative, the configuration may be included in a radio resource control (RRC) message (such as an sl-ConfigDedicatedNR data structure, as defined in 3GPP specifications and/or another standard). For example, the configuration may include an sl-startRb-longrange parameter indicating an initial RB associated with the second subchannel and an sl-NumSubchannel-longrange parameter indicating a range of RBs associated with the second subchannel (e.g., to be defined in 3GPP specifications and/or another standard).

As an alternative, and as shown by reference number 1105b, the Rx UE 120a may transmit, and the Tx UE 120b may receive, a message indicating that the Rx UE 120a is capable of performing decoding using multiple cyclic shift hypotheses. Accordingly, the Tx UE 120b may transmit data to the Rx UE 120a without using separate resources based on distance and without reducing a quantity of possible cyclic shifts.

Accordingly, as shown by reference number 1110, the Tx UE 120b may transmit, and the Rx UE 120a may receive, data. The Tx UE 120b may transmit the data with DMRSs such that the Rx UE 120a may demodulate and decode the data, as shown by reference number 1115.

In some aspects, the Tx UE 120b may transmit DMRSs on either the first set of resources or the second set of resources based at least in part on a distance associated with the DMRSs (e.g., determined similarly as described in connection with FIG. 6). As an alternative, when the Rx UE 120a is capable of considering all possible cyclic shifts in parallel to decode the data, the Tx UE 120b may transmit the DMRSs regardless of the distance associated with the DMRSs.

By using techniques as described in connection with FIG. 11, the Rx mobile station 120a configures the Tx mobile station 120b to transmit DMRSs in resources dedicated for long-range DMRSs and/or uses multiple cyclic shift hypotheses to compensate for propagation delay. As a result, the Rx mobile station 120a is able to use the DMRSs for more accurate decoding, which keeps power, processing resources, and network resources from being wasted. Additionally, quality of communications between the mobile stations 120a and 120b is improved.

As indicated above, FIG. 11 is provided as an example. Other examples may differ from what is described with respect to FIG. 11.

Figure 12:
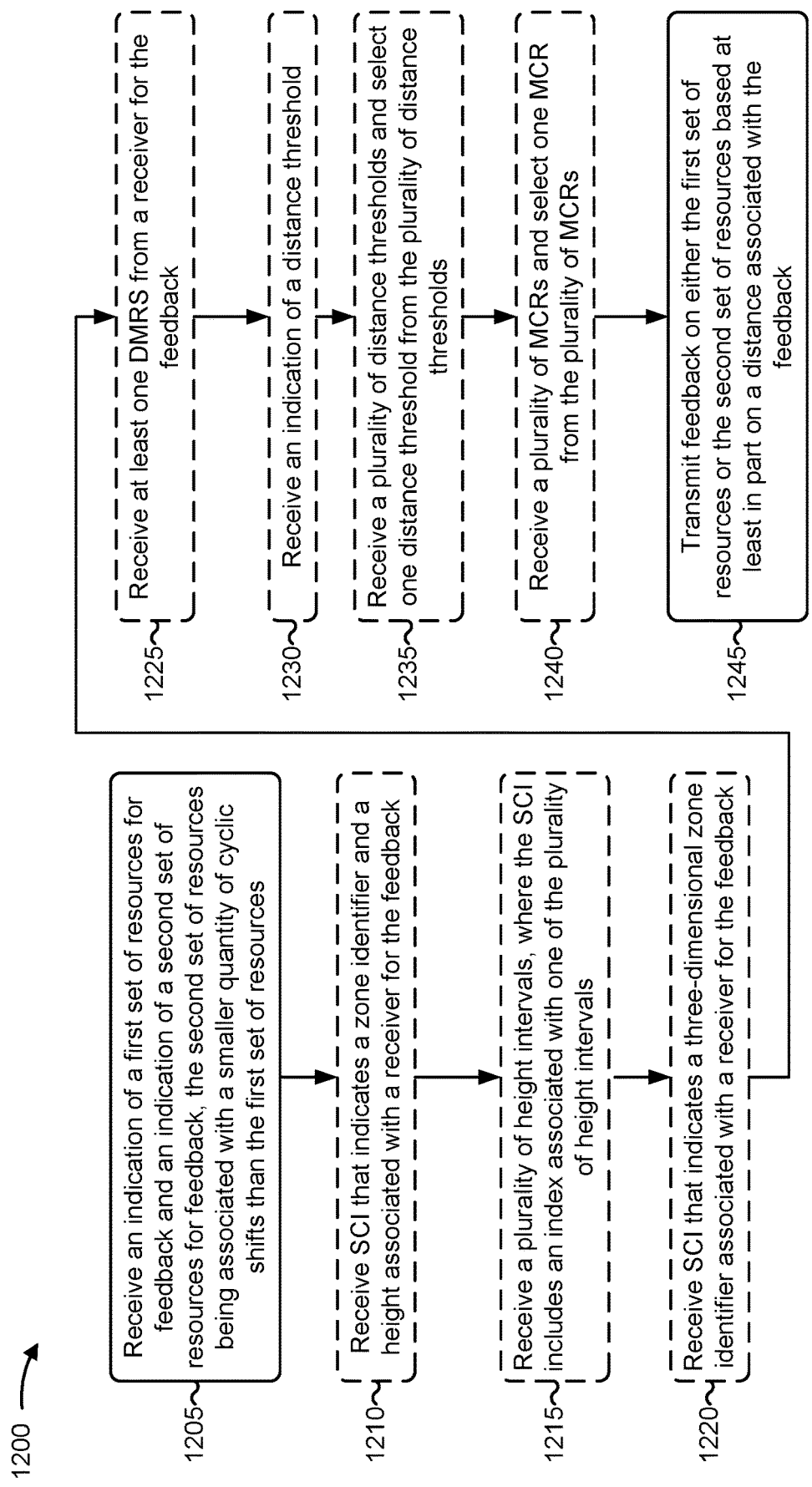
FIGS. 12, 13, 14, and 15 are diagrams illustrating example processes associated with configuring and using sidelink feedback resources, in accordance with the present disclosure.

FIG. 12 is a diagram illustrating an example process 1200 performed, for example, by a mobile station, in accordance with the present disclosure. Example process 1200 is an example where the mobile station (e.g., UE 120 and/or apparatus 2000 of FIG. 20) performs operations associated with using sidelink feedback resources.

As shown in FIG. 12, in some aspects, process 1200 may include receiving an indication of a first set of resources for feedback and an indication of a second set of resources for feedback (block 1205). For example, the mobile station (e.g., using communication manager 140 and/or reception component 2002, depicted in FIG. 20) may receive an indication of a first set of resources for feedback and an indication of a second set of resources for feedback, as described in connection with FIGS. 5-8. In some aspects, the second set of resources are associated with a smaller quantity of cyclic shifts than the first set of resources. The indication may be received from another mobile station and/or from a memory of the mobile station (e.g., configured according to 3GPP specifications and/or another standard).

In some aspects, as further shown in FIG. 12, process 1200 may include receiving SCI that indicates a zone identifier and a height associated with a receiver for the feedback (block 1210). For example, the mobile station (e.g., using communication manager 140 and/or reception component 2002) may receive SCI that indicates a zone identifier and a height associated with a receiver for the feedback, as described in connection with FIGS. 5-8. In some aspects, the distance associated with feedback is based at least in part on the zone identifier and the height.

Additionally, in some aspects, process 1200 may include receiving a plurality of height intervals (block 1215). For example, the mobile station (e.g., using communication manager 140 and/or reception component 2002) may receive a plurality of height intervals, as described in connection with FIGS. 5-8. In some aspects, the height indicated in the SCI includes an index associated with one of the plurality of height intervals. The plurality of height intervals may be received from another mobile station and/or from a memory of the mobile station (e.g., configured according to 3GPP specifications and/or another standard).

Additionally, or alternatively, in some aspects, process 1200 may include receiving SCI that indicates a three-dimensional zone identifier associated with a receiver for the feedback (block 1220). For example, the mobile station (e.g., using communication manager 140 and/or reception component 2002) may receive SCI that indicates a three-dimensional zone identifier associated with a receiver for the feedback, as described in connection with FIGS. 5-8. In some aspects, the distance associated with feedback is based at least in part on the three-dimensional zone identifier.

Additionally, or alternatively, in some aspects, process 1200 may include receiving at least one DMRS from a receiver for the feedback (block 1225). For example, the mobile station (e.g., using communication manager 140 and/or reception component 2002) may receive at least one DMRS from a receiver for the feedback, as described in connection with FIGS. 5-8. In some aspects, the distance associated with feedback is determined based at least in part on the at least one DMRS.

Additionally, or alternatively, in some aspects, process 1200 may include receiving an indication of a distance threshold (block 1230). For example, the mobile station (e.g., using communication manager 140 and/or reception component 2002) may receive an indication of a distance threshold, as described in connection with FIGS. 5-8. In some aspects, the second set of resources is used when the distance satisfies the distance threshold.

Additionally, or alternatively, in some aspects, process 1200 may include receiving a plurality of distance thresholds and selecting one distance threshold of the plurality of distance thresholds based at least in part on a relative height associated with a receiver for the feedback (block 1235). For example, the mobile station (e.g., using communication manager 140, reception component 2002, and/or selection component 2008, depicted in FIG. 20) may receive a plurality of distance thresholds and select one distance threshold of the plurality of distance thresholds, as described in connection with FIGS. 5-8. The plurality of distance thresholds may be received from another mobile station and/or from a memory of the mobile station (e.g., configured according to 3GPP specifications and/or another standard).

In some aspects, the second set of resources is used when the distance satisfies the distance threshold. The mobile station may select the one distance threshold based at least in part on a relative height associated with a receiver for the feedback. As an alternative, the mobile station may receive, from the receiver for the feedback, an indication of the one distance threshold, of the plurality of distance thresholds, to use.

Additionally, or alternatively, in some aspects, process 1200 may include receiving a plurality of MCRs and selecting the MCR from the plurality of MCRs based at least in part on a relative height associated with a receiver for the feedback (block 1240). For example, the mobile station (e.g., using communication manager 140, reception component 2002, and/or selection component 2008) may receive a plurality of MCRs and select the MCR from the plurality of MCRs based at least in part on a relative height associated with a receiver for the feedback, as described in connection with FIGS. 5-8. In some aspects, the feedback is transmitted based at least in part on the selected MCR associated with the feedback. The plurality of MCRs may be received from another mobile station and/or from a memory of the mobile station (e.g., configured according to 3GPP specifications and/or another standard).

As further shown in FIG. 12, in some aspects, process 1200 may include transmitting feedback on either the first set of resources or the second set of resources based at least in part on a distance associated with the feedback (block 1245). For example, the mobile station (e.g., using communication manager 140 and/or transmission component 2004, depicted in FIG. 20) may transmit feedback on either the first set of resources or the second set of resources based at least in part on a distance associated with the feedback, as described in connection with FIGS. 5-8.

Process 1200 may include additional aspects, such as any single aspect or any combination of aspects described below and/or in connection with one or more other processes described elsewhere herein.

In a first aspect, the indication of the second set of resources includes a bitmap.

In a second aspect, alone or in combination with the first aspect, the second set of resources is associated with a different period than a period associated with the first set of resources.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
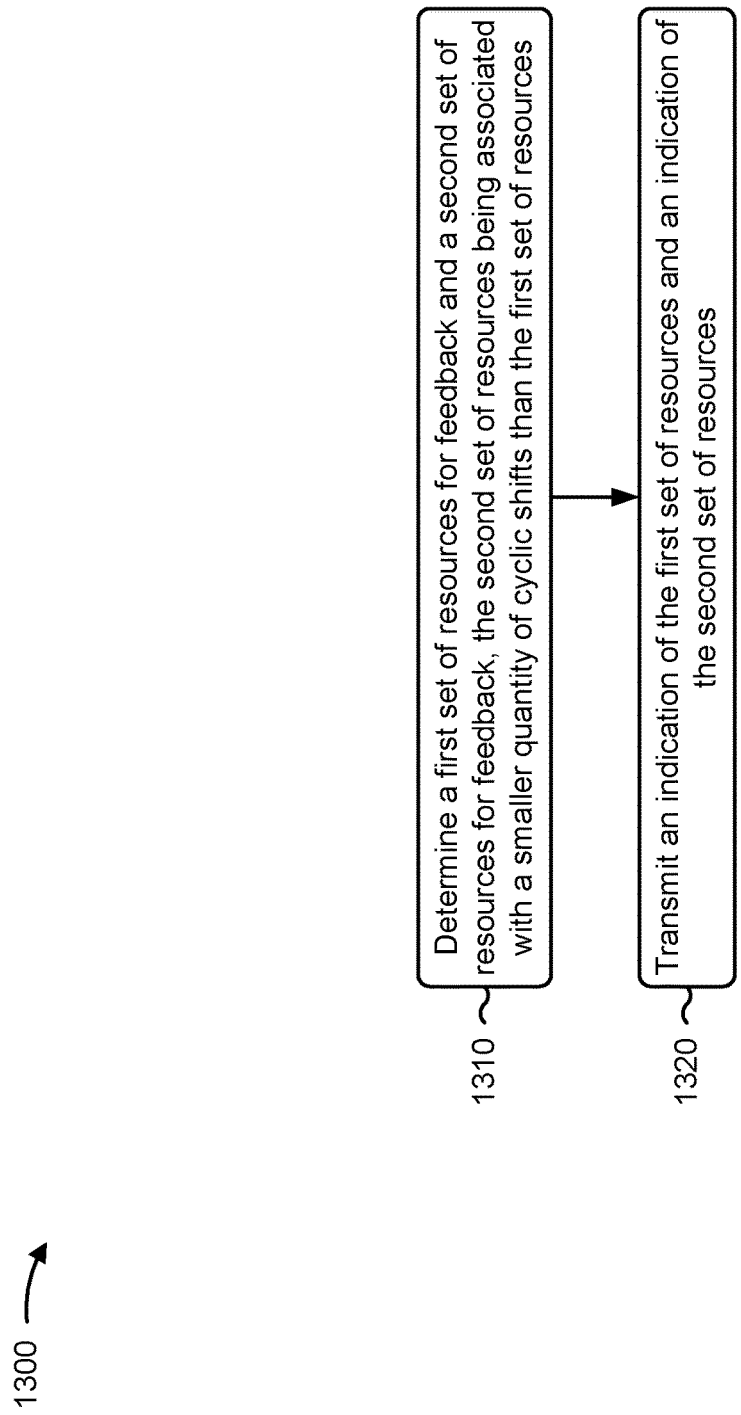

FIG. 13 is a diagram illustrating an example process 1300 performed, for example, by a mobile station, in accordance with the present disclosure. Example process 1300 is an example where the mobile station (e.g., UE 120 and/or apparatus 2000 of FIG. 20) performs operations associated with configuring sidelink feedback resources.

As shown in FIG. 13, in some aspects, process 1300 may include determining a first set of resources for feedback and a second set of resources for feedback (block 1310). For example, the mobile station (e.g., using communication manager 140 and/or determination component 2010, depicted in FIG. 20) may determine a first set of resources for feedback and a second set of resources for feedback, as described in connection with FIGS. 5-8. In some aspects, the second set of resources are associated with a smaller quantity of cyclic shifts than the first set of resources.

As further shown in FIG. 13, in some aspects, process 1300 may include transmitting an indication of the first set of resources and an indication of the second set of resources (block 1320). For example, the mobile station (e.g., using communication manager 140 and/or transmission component 2004, depicted in FIG. 20) may transmit an indication of the first set of resources and an indication of the second set of resources, as described in connection with FIGS. 5-8.

Process 1300 may include additional aspects, such as any single aspect or any combination of aspects described below and/or in connection with one or more other processes described elsewhere herein.

In a first aspect, the indication of the second set of resources comprises a bitmap.

In a second aspect, alone or in combination with the first aspect, the second set of resources is associated with a different period than a period associated with the first set of resources.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
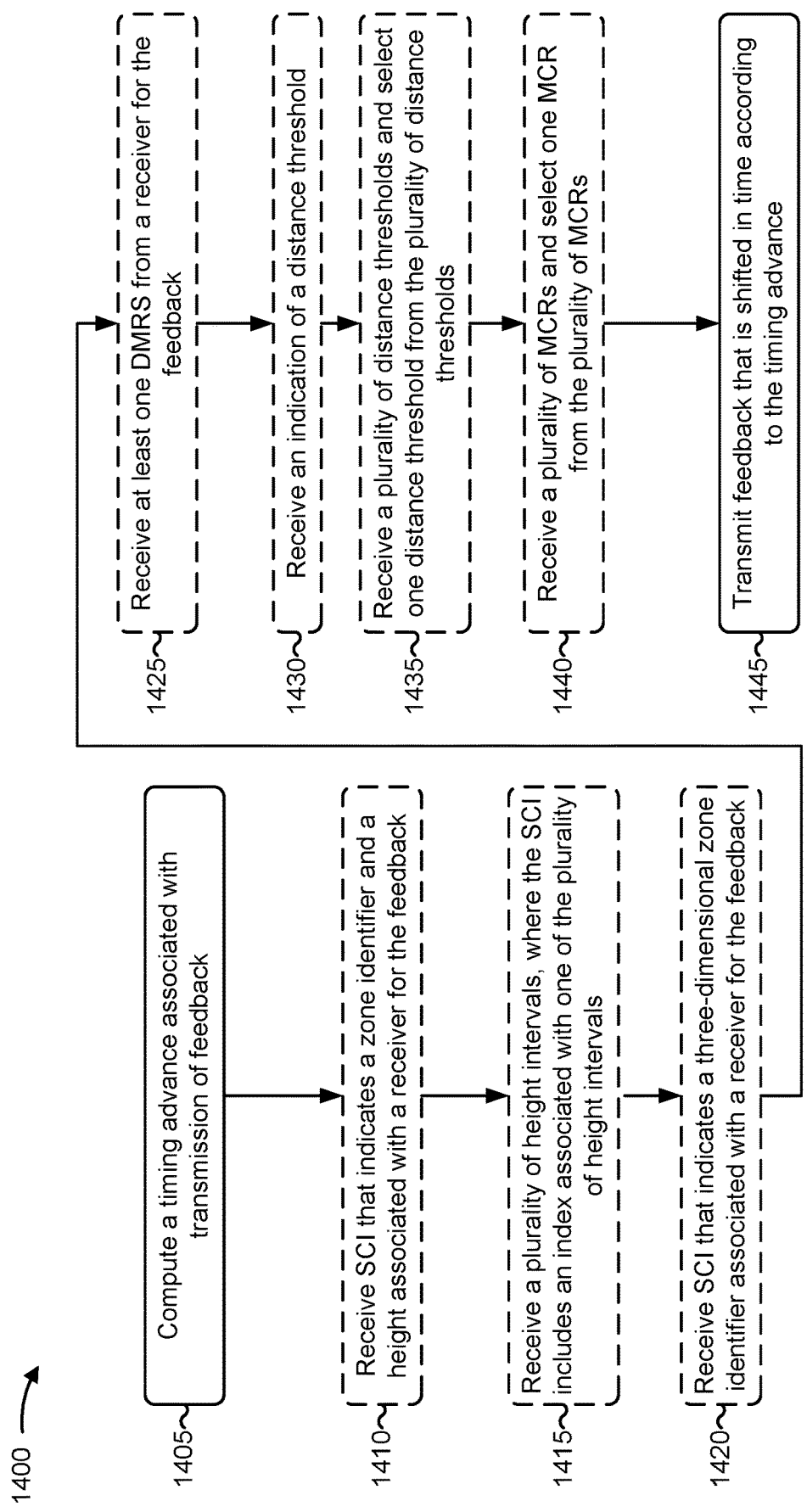

FIG. 14 is a diagram illustrating an example process 1400 performed, for example, by a mobile station, in accordance with the present disclosure. Example process 1400 is an example where the mobile station (e.g., UE 120 and/or apparatus 2000 of FIG. 20) performs operations associated with using sidelink feedback resources.

As shown in FIG. 14, in some aspects, process 1400 may include computing a timing advance associated with transmission of feedback (block 1405). For example, the mobile station (e.g., using communication manager 140 and/or computation component 2012, depicted in FIG. 20) may compute a timing advance associated with transmission of feedback, as described in connection with FIGS. 5-8.

In some aspects, as further shown in FIG. 14, process 1400 may include receiving SCI that indicates a zone identifier and a height associated with a receiver for the feedback (block 1410). For example, the mobile station (e.g., using communication manager 140 and/or reception component 2002) may receive SCI that indicates a zone identifier and a height associated with a receiver for the feedback, as described in connection with FIGS. 5-8. In some aspects, the timing advance associated with the transmission of the feedback is based at least in part on the zone identifier and the height.

Additionally, in some aspects, process 1400 may include receiving a plurality of height intervals (block 1415). For example, the mobile station (e.g., using communication manager 140 and/or reception component 2002) may receive a plurality of height intervals, as described in connection with FIGS. 5-8. In some aspects, the height indicated in the SCI includes an index associated with one of the plurality of height intervals. The plurality of height intervals may be received from another mobile station and/or from a memory of the mobile station (e.g., configured according to 3GPP specifications and/or another standard).

Additionally, or alternatively, in some aspects, process 1400 may include receiving SCI that indicates a three-dimensional zone identifier associated with a receiver for the feedback (block 1420). For example, the mobile station (e.g., using communication manager 140 and/or reception component 2002) may receive SCI that indicates a three-dimensional zone identifier associated with a receiver for the feedback, as described in connection with FIGS. 5-8. In some aspects, the timing advance associated with the transmission of the feedback is based at least in part on the three-dimensional zone identifier.

Additionally, or alternatively, in some aspects, process 1400 may include receiving at least one DMRS from a receiver for the feedback (block 1425). For example, the mobile station (e.g., using communication manager 140 and/or reception component 2002) may receive at least one DMRS from a receiver for the feedback, as described in connection with FIGS. 5-8. In some aspects, the timing advance associated with the transmission of the feedback is based at least in part on a distance associated with the feedback and determined based at least in part on the at least one DMRS.

Additionally, or alternatively, in some aspects, process 1400 may include receiving an indication of a distance threshold (block 1430). For example, the mobile station (e.g., using communication manager 140 and/or reception component 2002) may receive an indication of a distance threshold, as described in connection with FIGS. 5-8. In some aspects, the timing advance associated with the transmission of the feedback is applied when a distance associated with the feedback satisfies the distance threshold.

Additionally, or alternatively, in some aspects, process 1400 may include receiving a plurality of distance thresholds and selecting one distance threshold of the plurality of distance thresholds based at least in part on a relative height associated with a receiver for the feedback (block 1435). For example, the mobile station (e.g., using communication manager 140, reception component 2002, and/or selection component 2008, depicted in FIG. 20) may receive a plurality of distance thresholds and select one distance threshold of the plurality of distance thresholds, as described in connection with FIGS. 5-8. The plurality of distance thresholds may be received from another mobile station and/or from a memory of the mobile station (e.g., configured according to 3GPP specifications and/or another standard).

In some aspects, the timing advance associated with the transmission of the feedback is applied when a distance associated with the feedback satisfies the distance threshold. The mobile station may select the one distance threshold based at least in part on a relative height associated with a receiver for the feedback. As an alternative, the mobile station may receive, from the receiver for the feedback, an indication of the one distance threshold, of the plurality of distance thresholds, to use.

Additionally, or alternatively, in some aspects, process 1400 may include receiving a plurality of MCRs and selecting the MCR from the plurality of MCRs based at least in part on a relative height associated with a receiver for the feedback (block 1440). For example, the mobile station (e.g., using communication manager 140, reception component 2002, and/or selection component 2008) may receive a plurality of MCRs and select the MCR from the plurality of MCRs based at least in part on a relative height associated with a receiver for the feedback, as described in connection with FIGS. 5-8. In some aspects, the feedback is transmitted based at least in part on the selected MCR associated with the feedback. The plurality of MCRs may be received from another mobile station and/or from a memory of the mobile station (e.g., configured according to 3GPP specifications and/or another standard).

As further shown in FIG. 14, in some aspects, process 1400 may include transmitting feedback that is shifted in time according to the timing advance (block 1445). For example, the mobile station (e.g., using communication manager 140 and/or transmission component 2004, depicted in FIG. 20) may transmit feedback that is shifted in time according to the timing advance, as described in connection with FIGS. 5-8.

Process 1400 may include additional aspects, such as any single aspect or any combination of aspects described below and/or in connection with one or more other processes described elsewhere herein.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
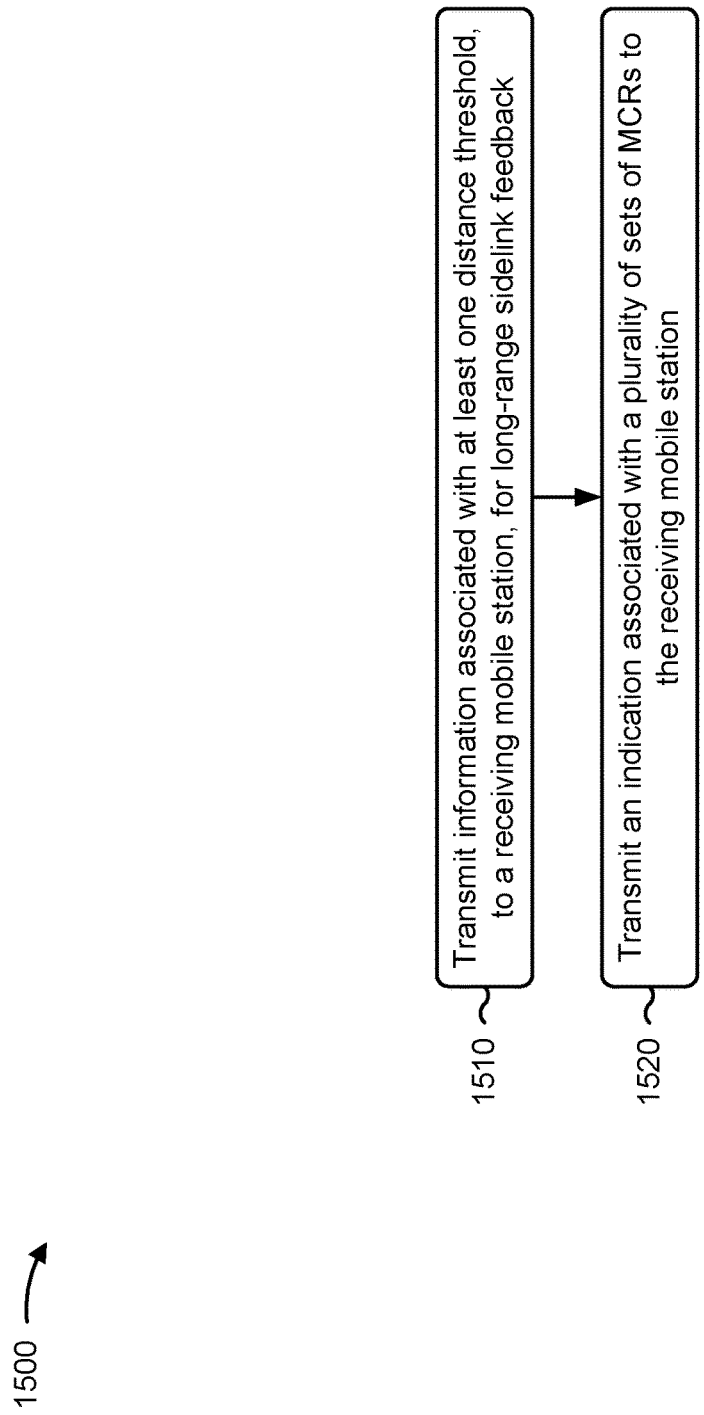

FIG. 15 is a diagram illustrating an example process 1500 performed, for example, by a mobile station, in accordance with the present disclosure. Example process 1500 is an example where the mobile station (e.g., UE 120 and/or apparatus 2000 of FIG. 20) performs operations associated with configuring sidelink feedback resources.

Figure 20:
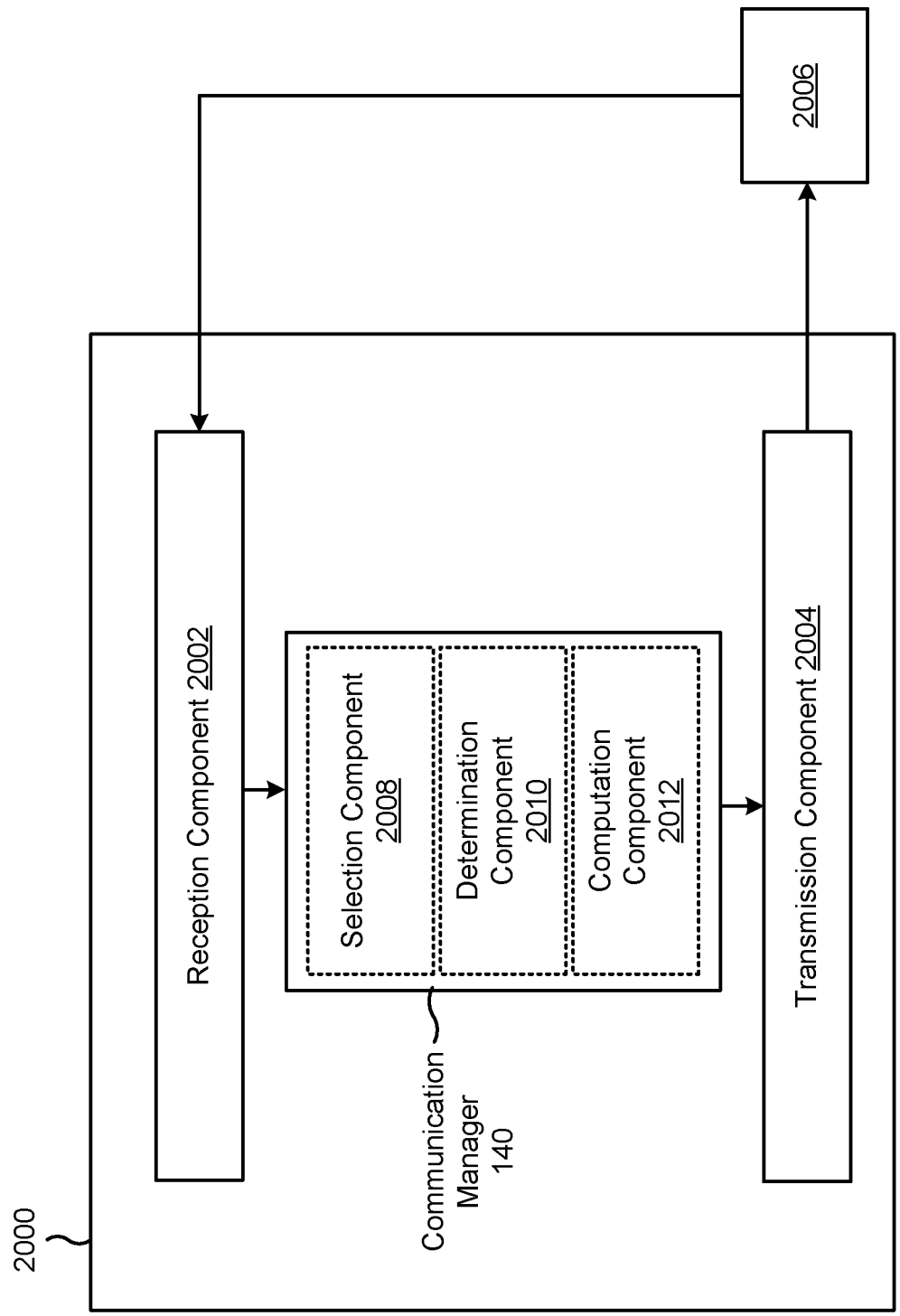
FIG. 20 is a diagram of an example apparatus for wireless communication, in accordance with the present disclosure.

As shown in FIG. 15, in some aspects, process 1500 may include transmitting information associated with at least one distance threshold (e.g., to a receiving mobile station, such as another UE and/or another apparatus 2000 of FIG. 20) for long-range sidelink feedback (block 1510). For example, the transmitting mobile station (e.g., using communication manager 140 and/or transmission component 2004, depicted in FIG. 20) may transmit information associated with at least one distance threshold, to a receiving mobile station, for long-range sidelink feedback, as described in connection with FIGS. 5-8.

As further shown in FIG. 15, in some aspects, process 1500 may include transmitting an indication associated with a plurality of sets of MCRs to the receiving mobile station (block 1520). For example, the transmitting mobile station (e.g., using communication manager 140 and/or transmission component 2004) may transmit an indication associated with a plurality of sets of MCRs to the receiving mobile station, as described in connection with FIGS. 5-8.

Process 1500 may include additional aspects, such as any single aspect or any combination of aspects described below and/or in connection with one or more other processes described elsewhere herein.

In a first aspect, the at least one distance threshold includes a plurality of distance thresholds, and each distance threshold, of the plurality of distance thresholds, is associated with a corresponding height, and the information indicates a height associated with the transmitting mobile station.

In a second aspect, alone or in combination with the first aspect, each set of MCRs, of the plurality of sets of MCRs, is associated with a corresponding height.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
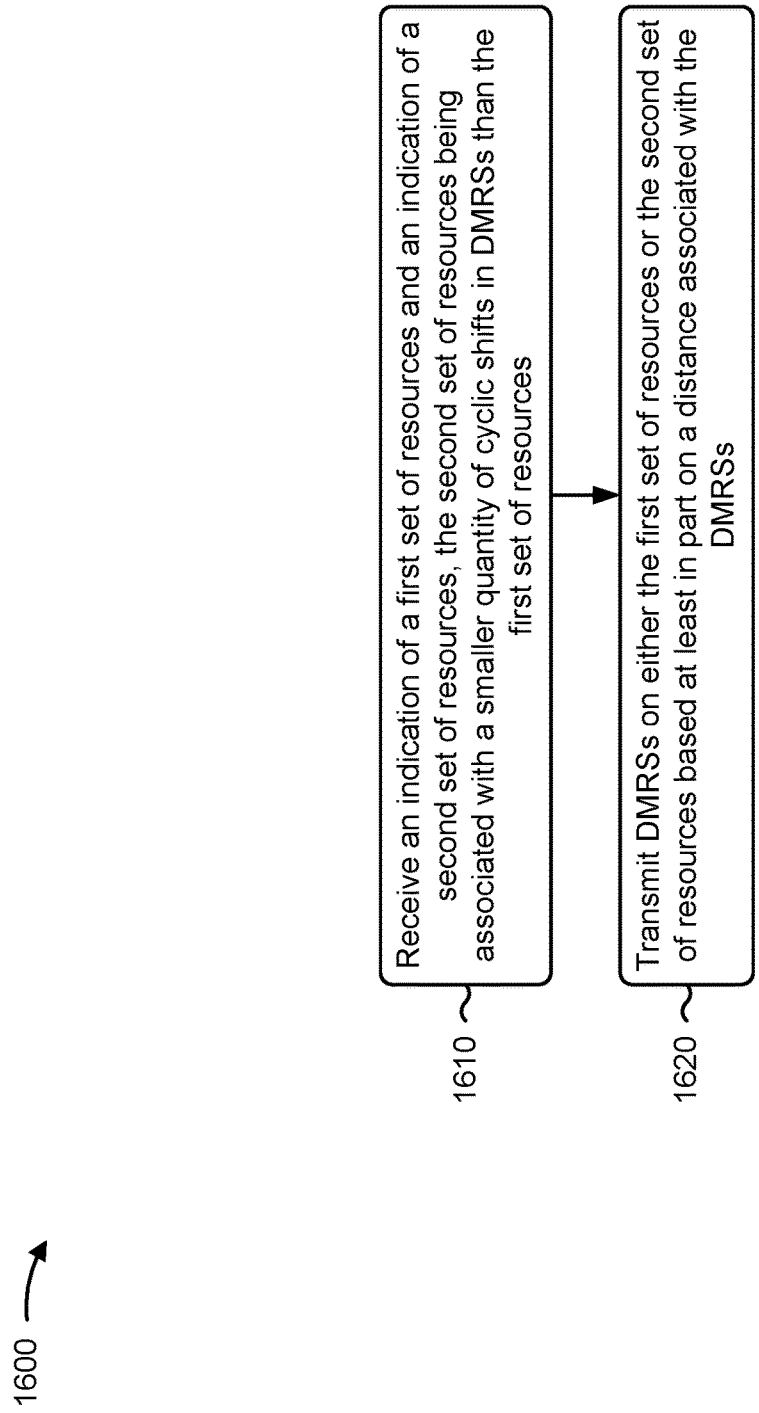
FIGS. 16, 17, 18, and 19 are diagrams illustrating example processes associated with configuration of DMRSs between mobile stations, in accordance with the present disclosure.

FIG. 16 is a diagram illustrating an example process 1600 performed, for example, by a mobile station, in accordance with the present disclosure. Example process 1600 is an example where the mobile station (e.g., UE 120 and/or apparatus 2000 of FIG. 20) performs operations associated with using DMRSs on a sidelink.

As shown in FIG. 16, in some aspects, process 1600 may include receiving an indication of a first set of resources and an indication of a second set of resources (block 1610). For example, the mobile station (e.g., using communication manager 140 and/or reception component 2002, depicted in FIG. 20) may receive an indication of a first set of resources and an indication of a second set of resources, as described in connection with FIG. 11. In some aspects, the second set of resources are associated with a smaller quantity of cyclic shifts in DMRSs than the first set of resources.

As further shown in FIG. 16, in some aspects, process 1600 may include transmitting DMRSs on either the first set of resources or the second set of resources based at least in part on a distance associated with the DMRSs (block 1620). For example, the mobile station (e.g., using communication manager 140 and/or transmission component 2004, depicted in FIG. 20) may transmit DMRSs on either the first set of resources or the second set of resources based at least in part on a distance associated with the DMRSs, as described in connection with FIG. 11.

Process 1600 may include additional aspects, such as any single aspect or any combination of aspects described below and/or in connection with one or more other processes described elsewhere herein.

In a first aspect, the first set of resources includes a first resource pool, and the second set of resources includes a second resource pool.

In a second aspect, alone or in combination with the first aspect, the first set of resources includes a first subchannel, and the second set of resources includes a second subchannel.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
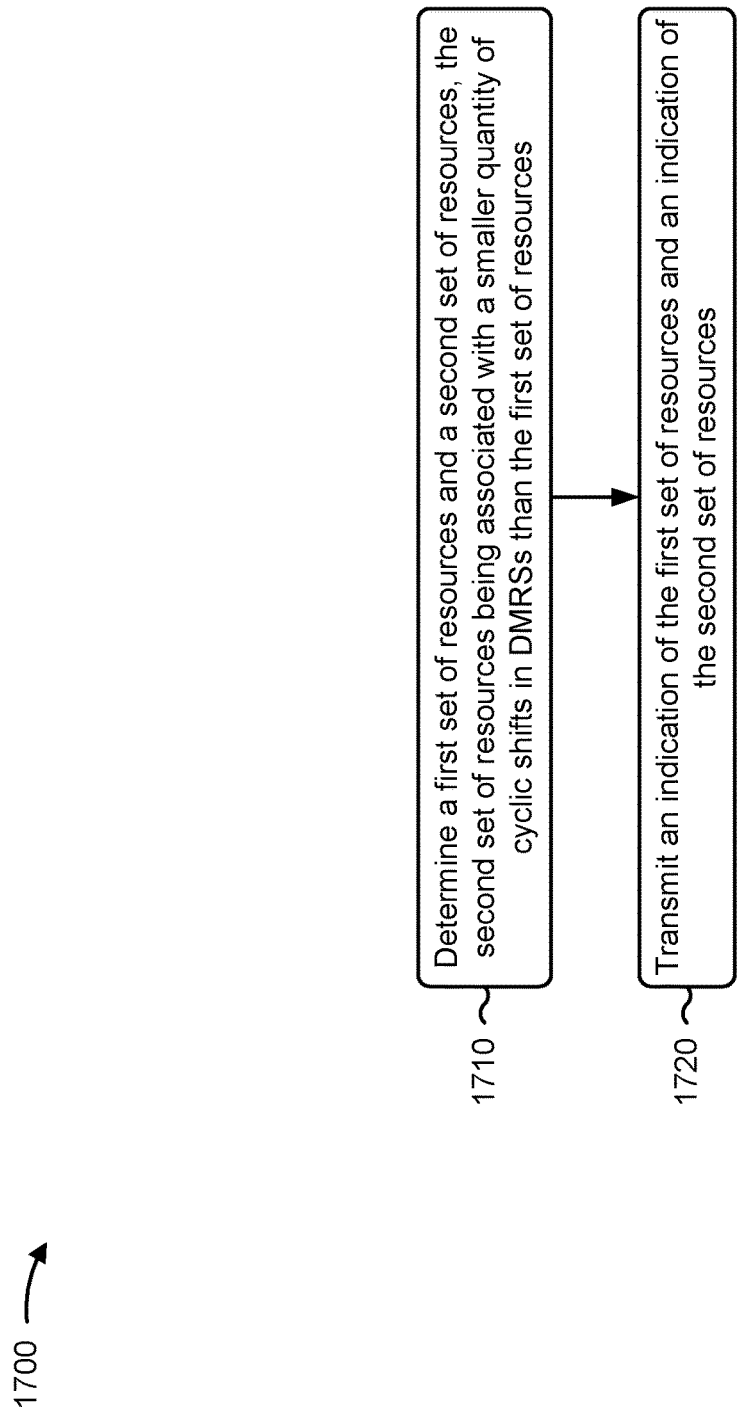

FIG. 17 is a diagram illustrating an example process 1700 performed, for example, by a mobile station, in accordance with the present disclosure. Example process 1700 is an example where the mobile station (e.g., UE 120 and/or apparatus 2000 of FIG. 20) performs operations associated with configuring DMRSs on a sidelink.

As shown in FIG. 17, in some aspects, process 1700 may include determining a first set of resources and a second set of resources (block 1710). For example, the mobile station (e.g., using communication manager 140 and/or determination component 2010, depicted in FIG. 20) may determine a first set of resources and a second set of resources, as described in connection with FIG. 11. In some aspects, the second set of resources are associated with a smaller quantity of cyclic shifts in DMRSs than the first set of resources.

As further shown in FIG. 17, in some aspects, process 1700 may include transmitting an indication of the first set of resources and an indication of the second set of resources (block 1720). For example, the mobile station (e.g., using communication manager 140 and/or transmission component 2004, depicted in FIG. 20) may transmit an indication of the first set of resources and an indication of the second set of resources, as described in connection with FIG. 11.

Process 1700 may include additional aspects, such as any single aspect or any combination of aspects described below and/or in connection with one or more other processes described elsewhere herein.

In a first aspect, the first set of resources includes a first resource pool, and the second set of resources includes a second resource pool.

In a second aspect, alone or in combination with the first aspect, the first set of resources includes a first subchannel, and the second set of resources includes a second subchannel.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
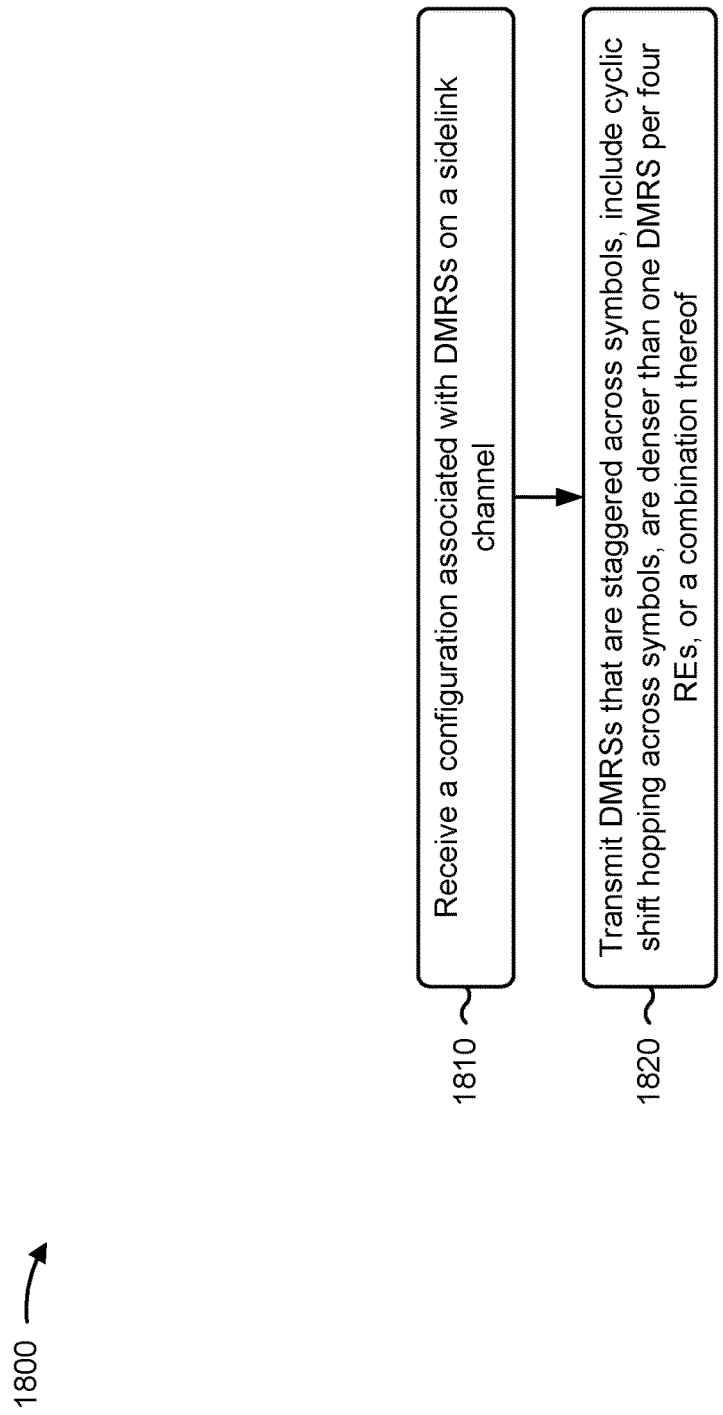

FIG. 18 is a diagram illustrating an example process 1800 performed, for example, by a mobile station, in accordance with the present disclosure. Example process 1800 is an example where the mobile station (e.g., UE 120 and/or apparatus 2000 of FIG. 20) performs operations associated with using DMRSs on a sidelink.

As shown in FIG. 18, in some aspects, process 1800 may include receiving a configuration associated with DMRSs on a sidelink channel (block 1810). For example, the mobile station (e.g., using communication manager 140 and/or reception component 2002, depicted in FIG. 20) may receive a configuration associated with DMRSs on a sidelink channel, as described in connection with FIGS. 9A, 9B, and/or 10.

As further shown in FIG. 18, in some aspects, process 1800 may include transmitting DMRSs that are staggered across symbols, include cyclic shift hopping across symbols, are denser than one DMRS per four REs, or a combination thereof (block 1820). For example, the mobile station (e.g., using communication manager 140 and/or transmission component 2004, depicted in FIG. 20) may transmit DMRSs that are staggered across symbols, include cyclic shift hopping across symbols, are denser than one DMRS per four REs, or a combination thereof, as described in connection with FIGS. 9A, 9B, and/or 10.

Process 1800 may include additional aspects, such as any single aspect or any combination of aspects described below and/or in connection with one or more other processes described elsewhere herein.

In a first aspect, the DMRSs are hopped across symbols such that the DMRSs can be coherently combined across symbols to perform decoding.

In a second aspect, alone or in combination with the first aspect, the DMRSs are hopped across symbols according to a pattern such that a cyclic shift associated with the DMRSs can be determined based at least in part on the pattern.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
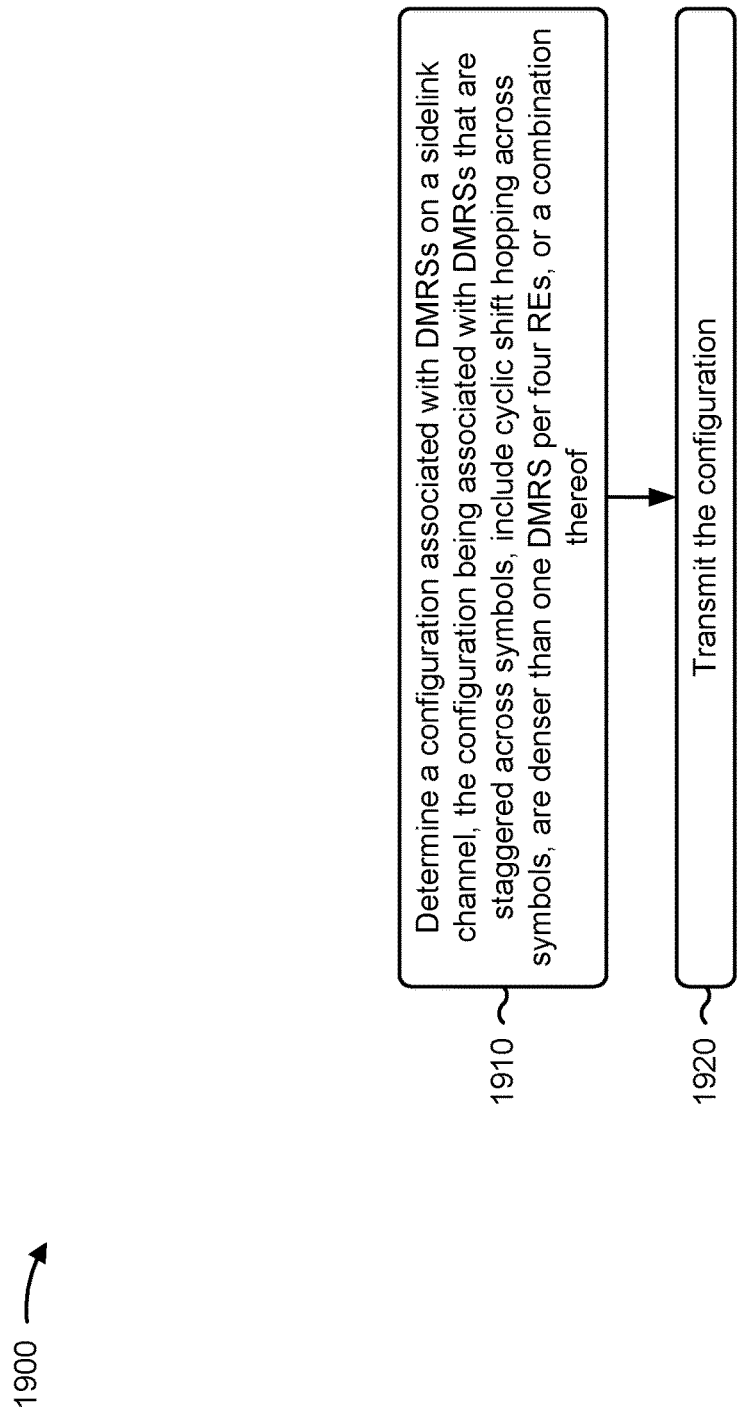

FIG. 19 is a diagram illustrating an example process 1900 performed, for example, by a mobile station, in accordance with the present disclosure. Example process 1900 is an example where the mobile station (e.g., UE 120 and/or apparatus 2000 of FIG. 20) performs operations associated with configuring DMRSs on a sidelink.

As shown in FIG. 19, in some aspects, process 1900 may include determining a configuration associated with DMRSs on a sidelink channel that is associated with DMRSs that are staggered across symbols, include cyclic shift hopping across symbols, are denser than one DMRS per four REs, or a combination thereof (block 1910). For example, the mobile station (e.g., using communication manager 140 and/or determination component 2010, depicted in FIG. 20) may determine a configuration associated with DMRSs on a sidelink channel that is associated with DMRSs that are staggered across symbols, include cyclic shift hopping across symbols, are denser than one DMRS per four REs, or a combination thereof, as described in connection with FIGS. 9A, 9B, and/or 10.

As further shown in FIG. 19, in some aspects, process 1900 may include transmitting the configuration (block 1920). For example, the mobile station (e.g., using communication manager 140 and/or transmission component 2004, depicted in FIG. 20) may transmit the configuration, as described in connection with FIGS. 9A, 9B, and/or 10.

Process 1900 may include additional aspects, such as any single aspect or any combination of aspects described below and/or in connection with one or more other processes described elsewhere herein.

In a first aspect, the configuration indicates symbols to use for hopping such that DMRSs can be coherently combined across the symbols to perform decoding.

In a second aspect, alone or in combination with the first aspect, the configuration indicates patterns for hopping across symbols such that cyclic shifts associated with DMRSs can be determined based at least in part on the patterns.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

FIG. 20 is a diagram of an example apparatus 2000 for wireless communication. The apparatus 2000 may be a UE, or a UE may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include the communication manager 140. The communication manager 140 may include one or more of a selection component 2008, a determination component 2010, or a computation component 2012, among other examples.

In some aspects, the apparatus 2000 may be configured to perform one or more operations described herein in connection with FIGS. 5-11. Additionally, or alternatively, the apparatus 2000 may be configured to perform one or more processes described herein, such as process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, or a combination thereof. In some aspects, the apparatus 2000 and/or one or more components shown in FIG. 20 may include one or more components of the UE described in connection with FIG. 2. Additionally, or alternatively, one or more components shown in FIG. 20 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, a modem, a demodulator, a MIMO detector, a receive processor, a controller/processor, a memory, or a combination thereof, of the UE described in connection with FIG. 2.

The transmission component 2004 may transmit communications, such as reference signals, control information, data communications, or a combination thereof, to the apparatus 2006. In some aspects, one or more other components of the apparatus 2000 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modem, a modulator, a transmit MIMO processor, a transmit processor, a controller/processor, a memory, or a combination thereof, of the UE described in connection with FIG. 2. In some aspects, the transmission component 2004 may be co-located with the reception component 2002 in a transceiver.

In some aspects, the reception component 2002 may receive (e.g., from the apparatus 2006) an indication of a first set of resources for feedback and an indication of a second set of resources for feedback. The second set of resources are associated with a smaller quantity of cyclic shifts than the first set of resources. Accordingly, the transmission component 2004 may transmit (e.g., to the apparatus 2006) feedback on either the first set of resources or the second set of resources based at least in part on a distance associated with the feedback.

In some aspects, the reception component 2002 may receive SCI that indicates a zone identifier and a height (e.g., associated with the apparatus 2006). Accordingly, the selection component 2008 selects the first set of resources or the second set of resources based at least in part on the zone identifier and the height. The selection component 2008 may include a transmit MIMO processor, a transmit processor, a receive processor, a controller/processor, a memory, or a combination thereof, of the UE described in connection with FIG. 2. In some aspects, the reception component 2002 may receive a plurality of height intervals, such that the height indicated in the SCI includes an index associated with one of the plurality of height intervals.

Additionally, or alternatively, the reception component 2002 may receive SCI that indicates a three-dimensional zone identifier (e.g., associated with the apparatus 2006). Accordingly, the selection component 2008 selects the first set of resources or the second set of resources based at least in part on the three-dimensional zone identifier.

Additionally, or alternatively, the reception component 2002 may receive at least one DMRS (e.g., from the apparatus 2006). Accordingly, the selection component 2008 selects the first set of resources or the second set of resources based at least in part on the at least one DMRS.

In some aspects, the reception component 2002 may receive an indication of a distance threshold. Accordingly, the selection component 2008 selects the second set of resources is used when the distance satisfies the distance threshold.

As an alternative, the reception component 2002 may receive a plurality of distance thresholds, and the selection component 2008 may select one distance threshold of the plurality of distance thresholds based at least in part on a relative height (e.g., associated with the apparatus 2006). As an alternative, the reception component 2002 may receive an indication of the one distance threshold, of the plurality of distance thresholds, to use.

Additionally, or alternatively, the computation component 2012 may compute a timing advance associated with transmission of feedback. The computation component 2012 may include a transmit MIMO processor, a transmit processor, a receive processor, a controller/processor, a memory, or a combination thereof, of the UE described in connection with FIG. 2. Accordingly, the transmission component 2004 may transmit feedback that is shifted in time according to the timing advance.

In some aspects, the reception component 2002 may receive SCI that indicates a zone identifier and a height (e.g., associated with the apparatus 2006). Accordingly, the computation component 2012 shifts the feedback in time based at least in part on the zone identifier and the height. In some aspects, the reception component 2002 may receive a plurality of height intervals, such that the height indicated in the SCI includes an index associated with one of the plurality of height intervals.

Additionally, or alternatively, the reception component 2002 may receive SCI that indicates a three-dimensional zone identifier (e.g., associated with the apparatus 2006). Accordingly, the computation component 2012 shifts the feedback in time based at least in part on the three-dimensional zone identifier.

Additionally, or alternatively, the reception component 2002 may receive at least one DMRS (e.g., from the apparatus 2006). Accordingly, the computation component 2012 shifts the feedback in time based at least in part on the at least one DMRS.

In some aspects, the reception component 2002 may receive an indication of a distance threshold. Accordingly, the computation component 2012 shifts the feedback in time when the distance satisfies the distance threshold.

As an alternative, the reception component 2002 may receive a plurality of distance thresholds, and the selection component 2008 may select one distance threshold of the plurality of distance thresholds based at least in part on a relative height (e.g., associated with the apparatus 2006). As an alternative, the reception component 2002 may receive an indication of the one distance threshold, of the plurality of distance thresholds, to use.

Additionally, or alternatively, the reception component 2002 may receive (e.g., from the apparatus 2006) an indication of a first set of resources and an indication of a second set of resources, where the second set of resources are associated with a smaller quantity of cyclic shifts in DMRSs than the first set of resources. Accordingly, the transmission component 2004 may transmit (e.g., to the apparatus 2006) DMRSs on either the first set of resources or the second set of resources based at least in part on a distance associated with the DMRSs.

As an alternative, the reception component 2002 may receive (e.g., from the apparatus 2006) a configuration associated with DMRSs on a sidelink channel. Accordingly, transmission component 2004 may transmit (e.g., to the apparatus 2006) DMRSs that are staggered across symbols, include cyclic shift hopping across symbols, are denser than one DMRS per four REs, or a combination thereof.

When the apparatus 2000 is a transmitting mobile station rather than receiving mobile station, the determination component 2010 may determine a first set of resources for feedback and a second set of resources for feedback. The second set of resources are associated with a smaller quantity of cyclic shifts than the first set of resources. The determination component 2010 may include a transmit MIMO processor, a transmit processor, a receive processor, a controller/processor, a memory, or a combination thereof, of the UE described in connection with FIG. 2. Accordingly, the transmission component 2004 may transmit (e.g., to the apparatus 2006) an indication of the first set of resources and an indication of the second set of resources.

Additionally, or alternatively, the transmission component 2004 may transmit information associated with at least one distance threshold (e.g., to the apparatus 2006) for long-range sidelink feedback. Additionally, the transmission component 2004 may transmit an indication associated with a plurality of sets of MCRs (e.g., to the apparatus 2006).

Additionally, or alternatively, the determination component 2010 may determine a first set of resources and a second set of resources, where the second set of resources are associated with a smaller quantity of cyclic shifts in DMRSs than the first set of resources. Accordingly, the transmission component 2004 may transmit (e.g., to the apparatus 2006) an indication of the first set of resources and an indication of the second set of resources.

As an alternative, the determination component 2010 may determine a configuration associated with DMRSs on a sidelink channel, where the configuration is associated with DMRSs that are staggered across symbols, include cyclic shift hopping across symbols, are denser than one DMRS per four REs, or a combination thereof. Accordingly, the transmission component 2004 may transmit (e.g., to the apparatus 2006) the configuration.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

The following provides an overview of some Aspects of the present disclosure:

Aspect 1: A method of wireless communication performed by a mobile station, comprising: receiving an indication of a first set of resources for feedback and an indication of a second set of resources for feedback, wherein the second set of resources are associated with a smaller quantity of cyclic shifts than the first set of resources; and transmitting feedback on either the first set of resources or the second set of resources based at least in part on a distance associated with the feedback.

Aspect 2: The method of Aspect 1, wherein the indication of the second set of resources comprises a bitmap.

Aspect 3: The method of any of Aspects 1 through 2, wherein the second set of resources is associated with a different period than a period associated with the first set of resources.

Aspect 4: The method of any of Aspects 1 through 3, further comprising: receiving sidelink control information (SCI) that indicates a zone identifier and a height associated with a receiver for the feedback, wherein the distance associated with feedback is based at least in part on the zone identifier and the height.

Aspect 5: The method of Aspect 4, further comprising: receiving a plurality of height intervals, wherein the height indicated in the SCI includes an index associated with one of the plurality of height intervals.

Aspect 6: The method of any of Aspects 1 through 5, further comprising: receiving sidelink control information (SCI) that indicates a three-dimensional zone identifier associated with a receiver for the feedback, wherein the distance associated with feedback is based at least in part on the three-dimensional zone identifier.

Aspect 7: The method of any of Aspects 1 through 6, further comprising: receiving at least one demodulation reference signal (DMRS) from a receiver for the feedback, wherein the distance associated with feedback is determined based at least in part on the at least one DMRS.

Aspect 8: The method of any of Aspects 1 through 7, further comprising: receiving an indication of a distance threshold, wherein the second set of resources is used when the distance satisfies the distance threshold.

Aspect 9: The method of any of Aspects 1 through 7, further comprising: receiving a plurality of distance thresholds; and selecting one distance threshold of the plurality of distance thresholds based at least in part on a relative height associated with a receiver for the feedback, wherein the second set of resources is used when the distance satisfies the distance threshold.

Aspect 10: The method of Aspect 9, further comprising: receiving, from the receiver for the feedback, an indication of the one distance threshold, of the plurality of distance thresholds, to use.

Aspect 11: The method of any of Aspects 1 through 10, wherein the feedback is transmitted based at least in part on a minimum communication range (MCR) associated with the feedback, and the method further comprises: receiving a plurality of MCRs; and selecting the MCR from the plurality of MCRs based at least in part on a relative height associated with a receiver for the feedback.

Aspect 12: A method of wireless communication performed by a mobile station, comprising: determining a first set of resources for feedback and a second set of resources for feedback, wherein the second set of resources are associated with a smaller quantity of cyclic shifts than the first set of resources; and transmitting an indication of the first set of resources and an indication of the second set of resources.

Aspect 13: The method of Aspect 12, wherein the indication of the second set of resources comprises a bitmap.

Aspect 14: The method of any of Aspects 12 through 13, wherein the second set of resources is associated with a different period than a period associated with the first set of resources.

Aspect 15: A method of wireless communication performed by a mobile station, comprising: computing a timing advance associated with transmission of feedback; and transmitting feedback that is shifted in time according to the timing advance.

Aspect 16: The method of Aspect 15, further comprising: receiving sidelink control information (SCI) that indicates a zone identifier and a height associated with a receiver for the feedback, wherein the timing advance associated with the transmission of the feedback is based at least in part on the zone identifier and the height.

Aspect 17: The method of Aspect 16, further comprising: receiving a plurality of height intervals, wherein the height indicated in the SCI includes an index associated with one of the plurality of height intervals.

Aspect 18: The method of any of Aspects 15 through 17, further comprising: receiving sidelink control information (SCI) that indicates a three-dimensional zone identifier associated with a receiver for the feedback, wherein the timing advance associated with the transmission of the feedback is based at least in part on the three-dimensional zone identifier.

Aspect 19: The method of any of Aspects 15 through 18, further comprising: receiving at least one demodulation reference signal (DMRS) from a receiver for the feedback, wherein the timing advance associated with the transmission of the feedback is based at least in part on a distance associated with the feedback and determined based at least in part on the at least one DMRS.

Aspect 20: The method of any of Aspects 15 through 19, further comprising: receiving an indication of a distance threshold, wherein the timing advance associated with the transmission of the feedback is applied when a distance associated with the feedback satisfies the distance threshold.

Aspect 21: The method of any of Aspects 15 through 19, further comprising: receiving a plurality of distance thresholds; and selecting one distance threshold of the plurality of distance thresholds based at least in part on a relative height associated with a receiver for the feedback, the timing advance associated with the transmission of the feedback is applied when a distance associated with the feedback satisfies the distance threshold.

Aspect 22: The method of Aspect 21, further comprising: receiving, from the receiver for the feedback, an indication of the one distance threshold, of the plurality of distance thresholds, to use.

Aspect 23: The method of any of Aspects 15 through 22, wherein the feedback is transmitted based at least in part on a minimum communication range (MCR) associated with the feedback, and the method further comprises: receiving a plurality of MCRs; and selecting the MCR from the plurality of MCRs based at least in part on a relative height associated with a receiver for the feedback.

Aspect 24: A method of wireless communication performed by a transmitting mobile station, comprising: transmitting information associated with at least one distance threshold, to a receiving mobile station, for long-range sidelink feedback; and transmitting an indication associated with a plurality of sets of minimum communication ranges (MCRs) to the receiving mobile station.

Aspect 25: The method of Aspect 24, wherein the at least one distance threshold includes a plurality of distance thresholds, and each distance threshold, of the plurality of distance thresholds, is associated with a corresponding height, and the information indicates a height associated with the transmitting mobile station.

Aspect 26: The method of any of Aspects 24 through 25, wherein each set of MCRs, of the plurality of sets of MCRs, is associated with a corresponding height.

Aspect 27: A method of wireless communication performed by a mobile station, comprising: receiving an indication of a first set of resources and an indication of a second set of resources, wherein the second set of resources are associated with a smaller quantity of cyclic shifts in demodulation reference signals (DMRSs) than the first set of resources; and transmitting DMRSs on either the first set of resources or the second set of resources based at least in part on a distance associated with the DMRSs.

Aspect 28: The method of Aspect 27, wherein the first set of resources includes a first resource pool, and the second set of resources includes a second resource pool.

Aspect 29: The method of Aspect 27, wherein the first set of resources includes a first subchannel, and the second set of resources includes a second subchannel.

Aspect 30: A method of wireless communication performed by a mobile station, comprising: determining a first set of resources and a second set of resources, wherein the second set of resources are associated with a smaller quantity of cyclic shifts in demodulation reference signals (DMRSs) than the first set of resources; and transmitting an indication of the first set of resources and an indication of the second set of resources.

Aspect 31: The method of Aspect 30, wherein the first set of resources includes a first resource pool, and the second set of resources includes a second resource pool.

Aspect 32: The method of Aspect 30, wherein the first set of resources includes a first subchannel, and the second set of resources includes a second subchannel.

Aspect 33: A method of wireless communication performed by a mobile station, comprising: receiving a configuration associated with demodulation reference signals (DMRSs) on a sidelink channel; and transmitting DMRSs that are staggered across symbols, include cyclic shift hopping across symbols, are denser than one DMRS per four resource elements (REs), or a combination thereof.

Aspect 34: The method of Aspect 33, wherein the DMRSs are hopped across symbols such that the DMRSs can be coherently combined across symbols to perform decoding.

Aspect 35: The method of Aspect 33, wherein the DMRSs are hopped across symbols according to a pattern such that a cyclic shift associated with the DMRSs can be determined based at least in part on the pattern.

Aspect 36: A method of wireless communication performed by a mobile station, comprising: determining a configuration associated with demodulation reference signals (DMRSs) on a sidelink channel, wherein the configuration is associated with DMRSs that are staggered across symbols, include cyclic shift hopping across symbols, are denser than one DMRS per four resource elements (REs), or a combination thereof, and transmitting the configuration.

Aspect 37: The method of Aspect 36, wherein the configuration indicates symbols to use for hopping such that DMRSs can be coherently combined across the symbols to perform decoding.

Aspect 38: The method of Aspect 36, wherein the configuration indicates patterns for hopping across symbols such that cyclic shifts associated with DMRSs can be determined based at least in part on the patterns.

Aspect 39: An apparatus for wireless communication at a device, comprising a processor; memory coupled with the processor; and instructions stored in the memory and executable by the processor to cause the apparatus to perform the method of one or more of Aspects 1-11.

Aspect 40: A device for wireless communication, comprising a memory and one or more processors coupled to the memory, the one or more processors configured to perform the method of one or more of Aspects 1-11.

Aspect 41: An apparatus for wireless communication, comprising at least one means for performing the method of one or more of Aspects 1-11.

Aspect 42: A non-transitory computer-readable medium storing code for wireless communication, the code comprising instructions executable by a processor to perform the method of one or more of Aspects 1-11.

Aspect 43: A non-transitory computer-readable medium storing a set of instructions for wireless communication, the set of instructions comprising one or more instructions that, when executed by one or more processors of a device, cause the device to perform the method of one or more of Aspects 1-11.

Aspect 44: An apparatus for wireless communication at a device, comprising a processor; memory coupled with the processor; and instructions stored in the memory and executable by the processor to cause the apparatus to perform the method of one or more of Aspects 12-14.

Aspect 45: A device for wireless communication, comprising a memory and one or more processors coupled to the memory, the one or more processors configured to perform the method of one or more of Aspects 12-14.

Aspect 46: An apparatus for wireless communication, comprising at least one means for performing the method of one or more of Aspects 12-14.

Aspect 47: A non-transitory computer-readable medium storing code for wireless communication, the code comprising instructions executable by a processor to perform the method of one or more of Aspects 12-14.

Aspect 48: A non-transitory computer-readable medium storing a set of instructions for wireless communication, the set of instructions comprising one or more instructions that, when executed by one or more processors of a device, cause the device to perform the method of one or more of Aspects 12-14.

Aspect 49: An apparatus for wireless communication at a device, comprising a processor; memory coupled with the processor; and instructions stored in the memory and executable by the processor to cause the apparatus to perform the method of one or more of Aspects 15-23.

Aspect 50: A device for wireless communication, comprising a memory and one or more processors coupled to the memory, the one or more processors configured to perform the method of one or more of Aspects 15-23.

Aspect 51: An apparatus for wireless communication, comprising at least one means for performing the method of one or more of Aspects 15-23.

Aspect 52: A non-transitory computer-readable medium storing code for wireless communication, the code comprising instructions executable by a processor to perform the method of one or more of Aspects 15-23.

Aspect 53: A non-transitory computer-readable medium storing a set of instructions for wireless communication, the set of instructions comprising one or more instructions that, when executed by one or more processors of a device, cause the device to perform the method of one or more of Aspects 15-23.

Aspect 54: An apparatus for wireless communication at a device, comprising a processor; memory coupled with the processor; and instructions stored in the memory and executable by the processor to cause the apparatus to perform the method of one or more of Aspects 24-26.

Aspect 55: A device for wireless communication, comprising a memory and one or more processors coupled to the memory, the one or more processors configured to perform the method of one or more of Aspects 24-26.

Aspect 56: An apparatus for wireless communication, comprising at least one means for performing the method of one or more of Aspects 24-26.

Aspect 57: A non-transitory computer-readable medium storing code for wireless communication, the code comprising instructions executable by a processor to perform the method of one or more of Aspects 24-26.

Aspect 58: A non-transitory computer-readable medium storing a set of instructions for wireless communication, the set of instructions comprising one or more instructions that, when executed by one or more processors of a device, cause the device to perform the method of one or more of Aspects 24-26.

Aspect 59: An apparatus for wireless communication at a device, comprising a processor; memory coupled with the processor; and instructions stored in the memory and executable by the processor to cause the apparatus to perform the method of one or more of Aspects 27-29.

Aspect 60: A device for wireless communication, comprising a memory and one or more processors coupled to the memory, the one or more processors configured to perform the method of one or more of Aspects 27-29.

Aspect 61: An apparatus for wireless communication, comprising at least one means for performing the method of one or more of Aspects 27-29.

Aspect 62: A non-transitory computer-readable medium storing code for wireless communication, the code comprising instructions executable by a processor to perform the method of one or more of Aspects 27-29.

Aspect 63: A non-transitory computer-readable medium storing a set of instructions for wireless communication, the set of instructions comprising one or more instructions that, when executed by one or more processors of a device, cause the device to perform the method of one or more of Aspects 27-29.

Aspect 64: An apparatus for wireless communication at a device, comprising a processor; memory coupled with the processor; and instructions stored in the memory and executable by the processor to cause the apparatus to perform the method of one or more of Aspects 30-32.

Aspect 65: A device for wireless communication, comprising a memory and one or more processors coupled to the memory, the one or more processors configured to perform the method of one or more of Aspects 30-32.

Aspect 66: An apparatus for wireless communication, comprising at least one means for performing the method of one or more of Aspects 30-32.

Aspect 67: A non-transitory computer-readable medium storing code for wireless communication, the code comprising instructions executable by a processor to perform the method of one or more of Aspects 30-32.

Aspect 68: A non-transitory computer-readable medium storing a set of instructions for wireless communication, the set of instructions comprising one or more instructions that, when executed by one or more processors of a device, cause the device to perform the method of one or more of Aspects 30-32.

Aspect 69: An apparatus for wireless communication at a device, comprising a processor; memory coupled with the processor; and instructions stored in the memory and executable by the processor to cause the apparatus to perform the method of one or more of Aspects 33-35.

Aspect 70: A device for wireless communication, comprising a memory and one or more processors coupled to the memory, the one or more processors configured to perform the method of one or more of Aspects 33-35.

Aspect 71: An apparatus for wireless communication, comprising at least one means for performing the method of one or more of Aspects 33-35.

Aspect 72: A non-transitory computer-readable medium storing code for wireless communication, the code comprising instructions executable by a processor to perform the method of one or more of Aspects 33-35.

Aspect 73: A non-transitory computer-readable medium storing a set of instructions for wireless communication, the set of instructions comprising one or more instructions that, when executed by one or more processors of a device, cause the device to perform the method of one or more of Aspects 33-35.

Aspect 74: An apparatus for wireless communication at a device, comprising a processor; memory coupled with the processor; and instructions stored in the memory and executable by the processor to cause the apparatus to perform the method of one or more of Aspects 36-38.

Aspect 75: A device for wireless communication, comprising a memory and one or more processors coupled to the memory, the one or more processors configured to perform the method of one or more of Aspects 36-38.

Aspect 76: An apparatus for wireless communication, comprising at least one means for performing the method of one or more of Aspects 36-38.

Aspect 77: A non-transitory computer-readable medium storing code for wireless communication, the code comprising instructions executable by a processor to perform the method of one or more of Aspects 36-38.

Aspect 78: A non-transitory computer-readable medium storing a set of instructions for wireless communication, the set of instructions comprising one or more instructions that, when executed by one or more processors of a device, cause the device to perform the method of one or more of Aspects 36-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
    a memory; and
    one or more processors, coupled to the memory, configured to:
        receive an indication of a first set of resources for feedback and an indication of a second set of resources for feedback, wherein the second set of resources are associated with a smaller quantity of cyclic shifts than the first set of resources; and
        transmit feedback on either the first set of resources or the second set of resources based at least in part on a distance associated with the feedback.

2. The apparatus of claim 1, wherein the indication of the second set of resources comprises a bitmap.

3. The apparatus of claim 1, wherein the second set of resources is associated with a different period than a period associated with the first set of resources.

4. The apparatus of claim 1, wherein the one or more processors are further configured to:
    receive sidelink control information (SCI) that indicates a zone identifier and a height associated with a receiver for the feedback,
    wherein the distance associated with feedback is based at least in part on the zone identifier and the height.

5. The apparatus of claim 4, wherein the one or more processors are further configured to:
    receive a plurality of height intervals,
    wherein the height indicated in the SCI includes an index associated with one of the plurality of height intervals.

6. The apparatus of claim 1, wherein the one or more processors are further configured to:
    receive sidelink control information (SCI) that indicates a three-dimensional zone identifier associated with a receiver for the feedback,
    wherein the distance associated with feedback is based at least in part on the three-dimensional zone identifier.

7. The apparatus of claim 1, wherein the one or more processors are further configured to:
    receive at least one demodulation reference signal (DMRS) from a receiver for the feedback,
    wherein the distance associated with feedback is determined based at least in part on the at least one DMRS.

8. The apparatus of claim 1, wherein the one or more processors are further configured to:
    receive an indication of a distance threshold,
    wherein the second set of resources is used when the distance satisfies the distance threshold.

9. The apparatus of claim 1, wherein the one or more processors are further configured to:
    receive a plurality of distance thresholds; and
    select one distance threshold of the plurality of distance thresholds based at least in part on a relative height associated with a receiver for the feedback,
    wherein the second set of resources is used when the distance satisfies the distance threshold.

10. The apparatus of claim 9, wherein the one or more processors are further configured to:
    receive, from the receiver for the feedback, an indication of the one distance threshold, of the plurality of distance thresholds, to use.

11. The apparatus of claim 1, wherein the feedback is transmitted based at least in part on a minimum communication range (MCR) associated with the feedback, and the one or more processors are further configured to:
    receive a plurality of MCRs; and
    select the MCR from the plurality of MCRs based at least in part on a relative height associated with a receiver for the feedback.

12. An apparatus for wireless communication at a mobile station, comprising:
    a memory; and
    one or more processors, coupled to the memory, configured to:
        determine a first set of resources for feedback and a second set of resources for feedback, wherein the second set of resources are associated with a smaller quantity of cyclic shifts than the first set of resources; and
        transmit an indication of the first set of resources and an indication of the second set of resources.

13. The apparatus of claim 12, wherein the indication of the second set of resources comprises a bitmap.

14. The apparatus of claim 12, wherein the second set of resources is associated with a different period than a period associated with the first set of resources.

15. A method of wireless communication performed by a mobile station, comprising:
  receiving an indication of a first set of resources for feedback and an indication of a second set of resources for feedback, wherein the second set of resources are associated with a smaller quantity of cyclic shifts than the first set of resources; and
  transmitting feedback on either the first set of resources or the second set of resources based at least in part on a distance associated with the feedback.

16. The method of claim 15, further comprising:
  receiving sidelink control information (SCI) that indicates a zone identifier and a height associated with a receiver for the feedback,
  wherein the distance associated with feedback is based at least in part on the zone identifier and the height.

17. The method of claim 15, further comprising:
  receiving sidelink control information (SCI) that indicates a three-dimensional zone identifier associated with a receiver for the feedback,
  wherein the distance associated with feedback is based at least in part on the three-dimensional zone identifier.

18. The method of claim 15, further comprising:
  receiving at least one demodulation reference signal (DMRS) from a receiver for the feedback,
  wherein the distance associated with feedback is determined based at least in part on the at least one DMRS.

19. The method of claim 15, further comprising:
  receiving an indication of a distance threshold,
  wherein the second set of resources is used when the distance satisfies the distance threshold.

20. The method of claim 15, further comprising:
  receiving a plurality of distance thresholds; and
  selecting one distance threshold of the plurality of distance thresholds based at least in part on a relative height associated with a receiver for the feedback,
  wherein the second set of resources is used when the distance satisfies the distance threshold.

21. The method of claim 15, wherein the feedback is transmitted based at least in part on a minimum communication range (MCR) associated with the feedback, and the method further comprises:
  receiving a plurality of MCRs; and
  selecting the MCR from the plurality of MCRs based at least in part on a relative height associated with a receiver for the feedback.

22. A non-transitory computer-readable medium storing one or more instructions for wireless communication, the one or more instructions comprising:
  one or more instructions that, when executed by one or more processors of a mobile station, cause the one or more processors to:
    receive an indication of a first set of resources for feedback and an indication of a second set of resources for feedback, wherein the second set of resources are associated with a smaller quantity of cyclic shifts than the first set of resources; and
    transmit feedback on either the first set of resources or the second set of resources based at least in part on a distance associated with the feedback.

23. The non-transitory computer-readable medium of claim 22, wherein the indication of the second set of resources comprises a bitmap.

24. The non-transitory computer-readable medium of claim 22, wherein the second set of resources is associated with a different period than a period associated with the first set of resources.

25. The non-transitory computer-readable medium of claim 22, wherein the one or more instructions are further configured to cause the one or more processors to:
  receive sidelink control information (SCI) that indicates a zone identifier and a height associated with a receiver for the feedback,
  wherein the distance associated with feedback is based at least in part on the zone identifier and the height.

26. The non-transitory computer-readable medium of claim 25, wherein the one or more instructions are further configured to cause the one or more processors to:
  receive a plurality of height intervals,
  wherein the height indicated in the SCI includes an index associated with one of the plurality of height intervals.

27. The non-transitory computer-readable medium of claim 22, wherein the one or more instructions are further configured to cause the one or more processors to:
  receive sidelink control information (SCI) that indicates a three-dimensional zone identifier associated with a receiver for the feedback,
  wherein the distance associated with feedback is based at least in part on the three-dimensional zone identifier.

28. The non-transitory computer-readable medium of claim 22, wherein the one or more instructions are further configured to cause the one or more processors to:
  receive at least one demodulation reference signal (DMRS) from a receiver for the feedback,
  wherein the distance associated with feedback is determined based at least in part on the at least one DMRS.

29. The non-transitory computer-readable medium of claim 22, wherein the one or more instructions are further configured to cause the one or more processors to:
  receive an indication of a distance threshold,
  wherein the second set of resources is used when the distance satisfies the distance threshold.

30. The non-transitory computer-readable medium of claim 22, wherein the one or more instructions are further configured to cause the one or more processors to:
  receive a plurality of distance thresholds; and
  select one distance threshold of the plurality of distance thresholds based at least in part on a relative height associated with a receiver for the feedback,
  wherein the second set of resources is used when the distance satisfies the distance threshold.

* * * * *